US012795472B2

(12) United States Patent
Hyde et al.

(10) Patent No.: US 12,795,472 B2
(45) Date of Patent: Nov. 10, 2026

(54) USING AI-BASED MODELS FOR NETWORK ENERGY SAVINGS

(71) Applicant: Intel Corporation, Santa Clara, CA (US)

(72) Inventors: Maruti Gupta Hyde, Portland, OR (US); Yi Zhang, San Jose, CA (US); Vaibhav Singh, New Delhi (IN); Ziyi Li, Beijing (CN); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 18/574,651

(22) PCT Filed: Oct. 19, 2022

(86) PCT No.: PCT/US2022/047151

§ 371 (c)(1),
(2) Date: Dec. 27, 2023

(87) PCT Pub. No.: WO2023/069534

PCT Pub. Date: Apr. 27, 2023

(65) Prior Publication Data

US 2024/0298225 A1 Sep. 5, 2024

Related U.S. Application Data

(60) Provisional application No. 63/270,505, filed on Oct. 21, 2021.

(51) Int. Cl.
*G06N 20/00* (2019.01)
*H04W 24/02* (2009.01)
(Continued)

(52) U.S. Cl.
CPC ....... *H04W 36/0072* (2013.01); *H04W 24/02* (2013.01); *H04W 52/02* (2013.01)

(58) Field of Classification Search
None
See application file for complete search history.

(56) References Cited

U.S. PATENT DOCUMENTS

2020/0367164 A1* 11/2020 Gupta ...................... G06N 3/08
2021/0021494 A1 1/2021 Yao et al.
(Continued)

FOREIGN PATENT DOCUMENTS

WO 2023069534 A1 4/2023

OTHER PUBLICATIONS

Vivo, "Discussion on AI based mobility optimization," R3-214130, 3rd Generation Partnership Project, vol. RAN WG3, No. eMeeting Aug. 9, 2021-Aug. 26, 2021, 3 pages XP052035764.
(Continued)

*Primary Examiner* — Minh Trang T Nguyen
(74) *Attorney, Agent, or Firm* — KDW FIRM PLLC

(57) ABSTRACT

An apparatus for an access node, includes a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of a machine learning (ML) model by the first NG-RAN node to select an energy saving state for the first NG-RAN node, the second NG-RAN node or a user equipment (UE), and generate one or more messages with an information element (IE) with one or more parameters to request measurement information according to the one or more parameters, the measurement information to comprise feedback
(Continued)

information to train the ML model. Other embodiments are described and claimed.

20 Claims, 16 Drawing Sheets

(51) Int. Cl.
*H04W 36/00* (2009.01)
*H04W 52/02* (2009.01)

(56) References Cited

U.S. PATENT DOCUMENTS

| | | | | |
|---|---|---|---|---|
| 2022/0191751 | A1* | 6/2022 | Rune | H04W 36/362 |
| 2022/0240138 | A1* | 7/2022 | Hwang | H04W 36/0058 |
| 2022/0361100 | A1* | 11/2022 | Dixit | H04W 52/0206 |
| 2023/0232298 | A1* | 7/2023 | Parichehrehteroujeni | H04W 36/0058 370/331 |
| 2023/0269142 | A1* | 8/2023 | Zhao | H04L 41/14 709/224 |
| 2023/0422127 | A1* | 12/2023 | Rahman | H04W 28/08 |

OTHER PUBLICATIONS

European Search Report for EP Application No. 22884426.2, dated Jul. 31, 2025, 13 pages.

3GPP—A Global Initiative, "3rd Generation Partnership Project: Technical Specification Group RAN Evolved Universal Terrestrial Radio Access EUTRA and NR Study on enhancement for Data Collection for NR and EN-DC," 3GPP TR 37.817 3rd, Release 17 no V0.3.0, Sep. 23, 2021, pp. 1-16. XP052056684.

Intel Corporation, "AI/ML based network energy saving," R3-213469, 3GPP TSG RAN WG3, Meeting #113-e, Aug. 6, 2021, pp. 4,8-11.

China Telecom et al., "Discussion paper on MDA assisted energy saving to provide necessary information in output," SS-215373, 3GPP TSG-SA5 Meeting #139-e, Oct. 1, 2021, pp. 1-3.

Intel Corporation, "High level principle and Functional Framework of AI/ML enabled NG-RAN Network," R3-213468, 3GPP TSG RAN WG3 Meeting #113-e, Aug. 6, 2021, pp. 1-8.

ZTE et al., "Solution to AI based Load prediction', R3-212033, 3GPP TSG RAN WG3 #112-e," May 7, 2021, pp. 1-12.

International Search Report and Written Opinion for the International Application No. PCT/US2022/047151, dated Feb. 21, 2023, 9 pages.

* cited by examiner

USING AI-BASED MODELS FOR NETWORK ENERGY SAVINGS

CROSS-REFERENCE TO RELATED APPLICATION

This application is a national stage filing under 35 U.S.C. 371 of pending International Application No. PCT/US2022/047151, filed Oct. 19, 2022, which claims the benefit of and priority to previously filed U.S. Provisional Patent Application Ser. No. 63/270,505, filed Oct. 21, 2021, entitled "USING AI-BASED MODELS FOR NETWORK ENERGY SAVINGS", which is hereby incorporated by reference in its entirety.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating, many wireless communication systems share the available communication channel resources among devices. Further, Internet-of-Thing (IoT) devices are also growing in usage and can coexist with user devices in various wireless communication systems such as cellular networks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
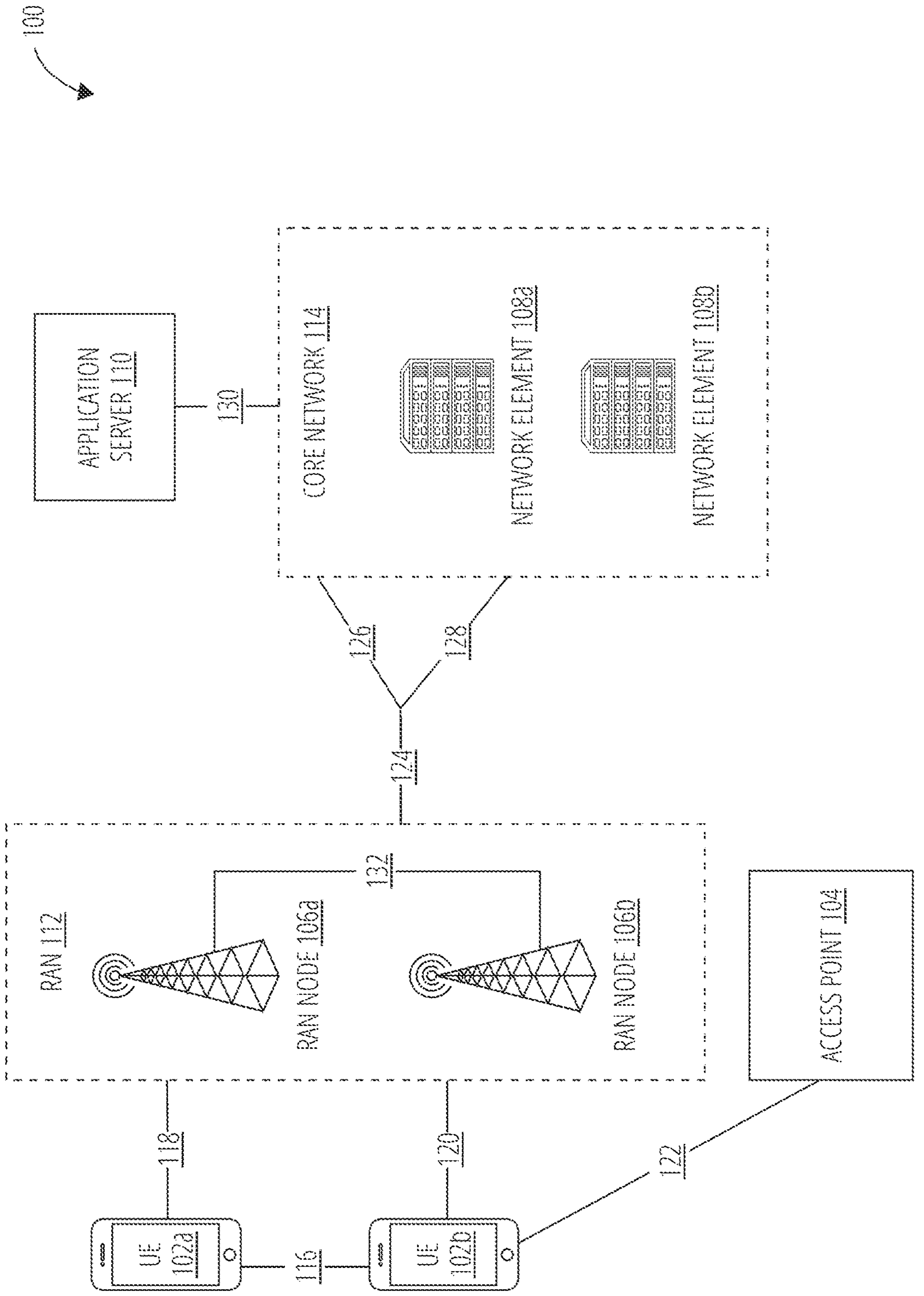
FIG. 1 illustrates a wireless communication system.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments may generally relate to the field of wireless communications. More particularly, various embodiments are directed to energy savings capabilities for wireless communications systems that enable energy savings for equipment, network site or network level of operations. For instance, embodiments relate to principles for radio access network (RAN) intelligence to enable energy efficiency (EE) through artificial intelligence (AI) and machine learning (ML) techniques (collectively referred to as "AI" or "ML" or "AI/ML"), a functional framework for AI/ML functionality, and input/output (I/O) of components for AI/ML enabled optimization, and use cases and solutions of AI/ML enabled RAN. For a Third Generation Partnership Project (3GPP) system, such as a 3GPP system compliant with a Technical Specification Group Service and System Aspects (TSG SA) working group five (SA5) Fifth Generation (5G) system, the RAN intelligence enabled by AI/ML can be implemented, for example, as part of a management data analytics (MDA) system or platform in alignment with the SA5 5G Services Based Management Architecture (SBMA). Embodiments are not limited to this example.

Resource sharing and network collaboration techniques between different network nodes (e.g., base stations, backhaul networks, core network, backbone, and user equipment (UE)) are enabled in a coordinated manner to support energy saving operations. The network nodes can share spatial and temporal knowledge of a radio network environment to enable energy efficient control of available radio resources to meet instantaneous demand on the wireless communications system. In some instances, energy efficiency control may be localized to a specific network entity and limited to a set of functions to achieve an energy savings target. Energy efficiency control is based on, at least in part, factors such as targeted energy efficiency key performance indicators (KPIs), targeted quality of service (QoS) or quality of experience (QoE) network capability in terms of capacity and coverage, spatial resolution and the resulting acquisition of measurements data including deployment scenarios (dense urban, urban, hotspot, indoor, rural areas), network load, traffic density, connection density as well as the types of services, and other considerations such as metadata describing the environment in time and space.

Some embodiments are directed to ongoing standardization activity in TSG RAN Working Group Three (WG3) (RAN3). RAN3 is responsible for an overall universal mobile telecommunications system (UMTS) terrestrial radio access network (UTRAN), an evolved UMTS terrestrial radio access network (E-UTRAN), and a next generation RAN (NG-RAN) architecture and the specification of protocols for the related network interfaces. Embodiments may relate to, for example, technical report (TR) 28.809 titled "Study on enhancement of Management Data Analytics" Release 16 version 17.0.0 (2021-03), TR 37.817 titled "Study on enhancement for Data Collection for NR and EN-DC" Release 17 version 0.3.0 (2021-08), TR 36.887 titled "Study on energy saving enhancement for E-UTRAN" Release 12 version 12.0.0 (2014-06), or technical standard (TS) 38.423 titled "Study of Technical Specification Group Radio Access Network; NG-RAN; Xn application protocol (XnAP)" Release 17 version 17.1.0 (2022-06), including any progeny, revisions and variants. Embodiments may be related to other standards as well. Embodiments are not limited in this context.

Some embodiments may be implemented as part of management data analytics (MDA) for a 3GPP system. For example, 3GPP TR 28.809 generally studies enhancements for MDA. More particularly, 3GPP TR 28.809 describes MDA use cases, identifies corresponding potential requirements, and presents possible solutions with analytics input and output (report). The study also captures the MDA functionality and service framework, MDA process, MDA role in management loop and management aspects of MDA. Moreover, the study provides recommendations for the normative specifications work in full alignment with the 3GPP TSG SA RAN3 and/or Working Group Five (SA5) 5G SBMA. The main objectives of SA5 are Management, Orchestration and Charging for 3GPP systems. Both functional and service perspectives are covered.

The MDA provides a capability of processing and analyzing raw data related to network and service events and status (e.g., performance measurements, Trace/MDT/RLF/RCEF reports, QoE reports, alarms, configuration data, network analytics data, and service experience data from AFs, etc.) to provide analytics report and recommended actions to enable the necessary actions for network and service operations. The MDA, in conjunction with AI/ML techniques, brings intelligence and automation to the network service management & orchestration. The MDA can help to perform management tasks in preparation, commissioning, operation as well as in the termination phases. For example, MDA can support service provisioning by preparing service catalogues, evaluating network requirements for a new service and carrying out feasibility check. During operation phase, the MDA can identify ongoing issues impacting the performance of the network and service, and discover in advance potential issues that would cause potential failure and/or performance degradation. The MDA can also assist to predict the network and service demand to enable the timely resource provisioning and deployments which would allow fast time-to-market network and service deployment.

The MDA can be consumed by various consumers, for instance management functions (MFs) (e.g., management services (MnS) service producers/consumers for network and service management), network functions (NFs) (e.g., network data analytics function (NWDAF)), self-organizing network (SON) functions, network and service optimization tools/functions, service level specification (SLS) assurance functions, human operators, applications functions (AFs), and so forth. The MDA is an enabler for the automation and cognition of the network and service management & orchestration.

One significant area of research and development in 3GPP standards is MDA related to energy savings for wireless networks. Various 3GPP entities can make decisions on when and how to implement energy saving techniques based on MDA implementations. In particular, different types of measurements associated with a 3GPP system can be used as input for AI/ML models implemented by an MDA system or platform. The output of the AI/ML models can be used as a basis to make energy saving decisions for a 3GPP system, such as when a device should enter a low-power state or handover to another cell, among a host of other energy saving techniques suitable for the 3GPP system.

There are a number of challenges associated with conventional 3GPP systems that remain unresolved with respect to implementing a comprehensive energy savings strategy. For instance, use cases as described within the 3GPP standards cover only a fraction of the kinds of information needed by the AI models to make the decisions to come up with a comprehensive energy saving strategy. The kind of information listed is generic and at a high level, such as current/predicted resource status, and are missing several important details. In addition, currently a 3GPP cell can only select one of two available power states, referred to as cell activation and cell deactivation. However, 3GPP new radio (NR) has defined a number of additional energy saving mechanisms on the network side other than cell activation and cell deactivation. A network element such as an access node (e.g., a base station, eNB, gNB, etc.) can enable and disable different types of functionalities based on these energy saving mechanisms. Therefore, the access node can enter or exit a defined set of power saving states with different functionality enabled or disabled for each state, and thus a different set of capabilities available to the access node for each of these states. While in these various types of lower power saving states, the access node may not necessarily be deactivated. However, the access node resource status and its capacity to service user equipment (UE) may be altered and thus should be communicated to neighboring cells.

Currently there is no standardized way for network elements to communicate their power saving capabilities in a manner that is independent of specific hardware capabilities. Instead, power saving capabilities are abstracted out to their respective service capabilities, such as an average cell range, cell capacity, cell throughput, cell load, and other metrics, in order for the neighboring cells to make power saving decisions of their own.

Various embodiments attempt to solve these and other challenges by describing new types of energy-related information, messages, information elements (IEs), information, parameters and other signaling that can be used to exchange measurement information between network elements, such as neighboring RAN nodes. Various embodiments also describe other metrics of the cell key performance indicators (KPIs) and the AI/ML models themselves in order to facilitate better decision making from the AI/ML models for system energy savings in a 3GPP network. In this manner, the embodiments can conserve compute, power, bandwidth and other scarce resources for an apparatus, device or system in a 3GPP wireless communication system.

In one embodiment, for example, various network nodes can implement management logic and/or a management node to implement an EE control and coordination function for a wireless communications system, such as a 5GNR system. The management node is a self-managed automated process (e.g., hardware, software or firmware) to control and coordinate system wide power saving operations including the access networks, core network, backhaul and fronthaul transmission networks, backbone networks and other subsystems.

In one embodiment, for example, an apparatus for a 3GPP-compliant access node (e.g., a base station, eNodeB, gNode B, etc.) may include a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of an ML model by the first NG-RAN node to select an energy saving state for the first NG-RAN node, the second NG-RAN node or a UE. The processor circuitry may generate a handover request message, the handover request message to request a preparation of resources for a handover of the UE to the second NG-RAN node or another NG-RAN node in a cellular system. The handover request message may include an information element (IE) with one or more parameters to request measurement information according to the one or more parameters. The measurement information may comprise feedback information to train the ML model. The processor circuitry may send an indication to transmit the handover request message from the first NG-RAN node to the second NG-RAN node, such as over a signaling interface. For instance, the signaling interface may comprise an Xn application protocol (XnAP) signaling service as defined by 3GPP 38.423, among other signaling interfaces.

In one embodiment, for example, an apparatus for a 3GPP-compliant access node (e.g., a base station, eNodeB, gNode B, etc.) may include a memory interface to send or receive, to or from a data storage device, measurement information for measurement signaling between a first NG-RAN node and a second NG-RAN node. The apparatus also includes processor circuitry communicatively coupled to the memory interface, the processor circuitry to initiate execution of a ML model by the first NG-RAN node to select an energy saving state for the first NG-RAN node, the second NG-RAN node or a UE. The processor circuitry may generate a resource status request message, the resource status request message to include an IE with one or more parameters to indicate initiation of a request for measurement information according to the one or more parameters. The measurement information may comprise feedback information to train the ML model, and send an indication to transmit the resource status request message from the first NG-RAN node to the second NG-RAN node, such as over a signaling interface. For instance, the signaling interface may comprise an XnAP signaling service as defined by 3GPP 38.423, among other signaling interfaces.

In one embodiment, for example, an apparatus for a 3GPP-compliant access node (e.g., a base station, eNodeB, gNode B, etc.) may include a memory interface to send or receive, to or from a data storage device, measurement information for measurement signaling between a first NG-RAN node and a second NG-RAN node. The apparatus also includes processor circuitry communicatively coupled to the memory interface, the processor circuitry to initiate execution of a ML model by the first NG-RAN node to select an energy saving state for the first NG-RAN node, the second NG-RAN node or a UE. The processor circuitry may decode a resource status update message received from the second NG-RAN node by the first NG-RAN node in response to a resource status request message sent by the first NG-RAN node to the second NG-RAN node. The resource status update message may include an IE with one or more parameters to indicate measurement information requested in the resource status request message. The measurement information may comprise feedback information to train the ML model, and train the ML model with the feedback information from the second NG-RAN node. The resource status update message may be communicated over a signaling interface. For instance, the signaling interface may comprise an XnAP signaling service as defined by 3GPP 38.423, among other signaling interfaces.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an example of a wireless communication wireless communications system 100. For purposes of convenience and without limitation, the example wireless communications system 100 is described in the context of the long-term evolution (LTE) and fifth generation (5G) new radio (NR) (5G NR) cellular networks communication standards as defined by one or more 3GPP technical specifications (TSs) and/or technical reports (TRs). However, other types of wireless standards are possible.

The wireless communications system 100 includes UE 102*a* and UE 102*b* (collectively referred to as the "UEs 102"). In this example, the UEs 102 are illustrated as smartphones (e.g., handheld touchscreen mobile computing devices connectable to one or more cellular networks). In other examples, any of the UEs 102 can include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 102 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data May be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages or status updates) to facilitate the connections of the IoT network.

The UEs 102 are configured to connect (e.g., communicatively couple) with a radio access network (RAN) 112. In some implementations, the RAN 112 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 112 that operates in a 5G NR wireless communications system 100, and the term "E-UTRAN" may refer to a RAN 112 that operates in an LTE or 4G wireless communications system 100.

To connect to the RAN 112, the UEs 102 utilize connections (or channels) 118 and 120, respectively, each of which can include a physical communications interface or layer, as described below. In this example, the connections 118 and 120 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The UE 102*b* is shown to be configured to access an access point (AP) 104 (also referred to as "WLAN node 104," "WLAN 104," "WLAN Termination 104," "WT 104" or the like) using a connection 122. The connection 122 can include a local wireless connection, such as a connection consistent with any IEEE 802.11 protocol, in which the AP 104 would include a wireless fidelity (Wi-Fi) router. In this example, the AP 104 is shown to be connected to the Internet without connecting to the core network of the wireless system, as described in further detail below.

The RAN 112 can include one or more nodes such as RAN nodes 106*a* and 106*b* (collectively referred to as "RAN nodes 106" or "RAN node 106") that enable the connections 118 and 120. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 106 that operates in an 5G NR wireless communications system 100 (for example, a gNB), and the term "E-UTRAN node" may refer to a RAN node 106 that operates in an LTE or 4G wireless communications system 100 (e.g., an eNB). In some implementations, the RAN nodes 106 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some implementations, some or all of the RAN nodes 106 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 106; a medium access control (MAC)/physical layer (PHY) split in which RRC, PDCP, MAC, and radio link control (RLC) layers are operated by the CRAN/vBBUP and the PHY layer is operated by individual RAN nodes 106; or a "lower PHY" split in which RRC, PDCP, RLC, and MAC layers and upper portions of the PHY layer are operated by the CRAN/vBBUP and lower portions of the PHY layer are operated by individual RAN nodes 106. This virtualized framework allows the freed-up processor cores of the RAN nodes 106 to perform, for example, other virtualized applications. In some implementations, an individual RAN node 106 may represent individual gNB distributed units (DUs) that are connected to a gNB central unit (CU) using individual F1 interfaces (not shown in FIG. 1). In some implementations, the gNB-DUs can include one or more remote radio heads or RFEMs, and the gNB-CU may be operated by a server that is located in the RAN 112 (not shown) or by a server pool in a similar manner as the CRAN/vBBUP. Additionally or alternatively, one or more of the RAN nodes 106 may be next generation eNBs (ng-eNBs), including RAN nodes that provide E-UTRA user plane and control plane protocol terminations toward the UEs 102, and are connected to a 5G core network (e.g., core network 114) using a next generation interface.

In vehicle-to-everything (V2X) scenarios, one or more of the RAN nodes 106 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 102 (vUEs 102). The RSU may also include internal data storage circuitry to store intersection map geometry, traffic statistics, media, as well as applications or other software to sense and control ongoing vehicular and pedestrian traffic. The RSU may operate on the 5.9 GHZ Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 or 5 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller or a backhaul network, or both.

Any of the RAN nodes 106 can terminate the air interface protocol and can be the first point of contact for the UEs 102. In some implementations, any of the RAN nodes 106 can fulfill various logical functions for the RAN 112 including, but not limited to, radio network controller (RNC) functions such as radio bearer management, uplink and downlink dynamic radio resource management and data packet scheduling, and mobility management.

In some implementations, the UEs 102 can be configured to communicate using orthogonal frequency division multiplexing (OFDM) communication signals with each other or with any of the RAN nodes 106 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

The RAN nodes 106 can transmit to the UEs 102 over various channels. Various examples of downlink communication channels include Physical Broadcast Channel (PBCH), Physical Downlink Control Channel (PDCCH), and Physical Downlink Shared Channel (PDSCH). Other types of downlink channels are possible. The UEs 102 can transmit to the RAN nodes 106 over various channels. Various examples of uplink communication channels include Physical Uplink Shared Channel (PUSCH), Physical Uplink Control Channel (PUCCH), and Physical Random Access Channel (PRACH). Other types of uplink channels are possible.

In some implementations, a downlink resource grid can be used for downlink transmissions from any of the RAN nodes 106 to the UEs 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The PDSCH carries user data and higher-layer signaling to the UEs 102. The PDCCH carries information about the transport format and resource allocations related to the PDSCH channel, among other things. It may also inform the UEs 102 about the transport format, resource allocation, and hybrid automatic repeat request (HARQ) information related to the uplink shared channel. Downlink scheduling (e.g., assigning control and shared channel resource blocks to the UE 102*b* within a cell) may be performed at any of the RAN nodes 106 based on channel quality information fed back from any of the UEs 102. The downlink resource assignment information may be sent on the PDCCH used for (e.g., assigned to) each of the UEs 102.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs.

The RAN nodes 106 are configured to communicate with one another using an interface 132. In examples, such as where the wireless communications system 100 is an LTE system (e.g., when the core network 114 is an evolved packet core (EPC) network), the interface 132 may be an X2 interface 132. The X2 interface may be defined between two or more RAN nodes 106 (e.g., two or more eNBs and the like) that connect to the EPC 114, or between two eNBs connecting to EPC 114, or both. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 102 from a secondary eNB for user data; information of PDCP PDUs that were not delivered to a UE 102; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

In some implementations, such as where the wireless communications system 100 is a 5G NR system (e.g., when the core network 114 is a 5G core network), the interface 132 may be an Xn interface 132. The Xn interface may be defined between two or more RAN nodes 106 (e.g., two or more gNBs and the like) that connect to the 5G core network 114, between a RAN node 106 (e.g., a gNB) connecting to the 5G core network 114 and an eNB, or between two eNBs connecting to the 5G core network 114, or combinations of them. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 102 in a connected mode (e.g., CM-CONNECTED) including functionality to manage the UE mobility for connected mode between one or more RAN nodes 106, among other functionalities. The mobility support can include context transfer from an old (source) serving RAN node 106 to new (target) serving RAN node 106, and control of user plane tunnels between old (source) serving RAN node 106 to new (target) serving RAN node 106. A protocol stack of the Xn-U can include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack can include an application layer signaling protocol (referred to as Xn Application Protocol (Xn-AP or XnAP)) and a transport network layer (TNL) that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 112 is shown to be communicatively coupled to a core network 114 (referred to as a "CN 114"). The CN 114 includes multiple network elements, such as network element 108*a* and network element 108*b* (collectively referred to as the "network elements 108"), which are configured to offer various data and telecommunications services to customers/subscribers (e.g., users of UEs 102) who are connected to the CN 114 using the RAN 112. The components of the CN 114 may be implemented in one physical node or separate physical nodes and can include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 114 may be referred to as a network slice, and a logical instantiation of a portion of the CN 114 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 110 may be an element offering applications that use IP bearer resources with the core network (e.g., UMTS packet services (PS) domain, LTE PS data services, among others). The application server 110 can also be configured to support one or more communication services (e.g., VOIP sessions, PTT sessions, group communication sessions, social networking services, among others) for the UEs 102 using the CN 114. The application server 110 can use an IP communications interface 130 to communicate with one or more network elements 108*a*.

In some implementations, the CN 114 may be a 5G core network (referred to as "5GC 114" or "5G core network 114"), and the RAN 112 may be connected with the CN 114 using a next generation interface 124. In some implementations, the next generation interface 124 may be split into two parts, a next generation user plane (NG-U) interface 114, which carries traffic data between the RAN nodes 106 and a user plane function (UPF), and the S1 control plane (NG-C) interface 126, which is a signaling interface between the RAN nodes 106 and access and mobility management functions (AMFs). Examples where the CN 114 is a 5G core network are discussed in more detail with regard to later figures.

In some implementations, the CN 114 may be an EPC (referred to as "EPC 114" or the like), and the RAN 112 may be connected with the CN 114 using an S1 interface 124. In some implementations, the S1 interface 124 may be split into two parts, an S1 user plane (S1-U) interface 128, which carries traffic data between the RAN nodes 106 and the serving gateway (S-GW), and the S1-MME interface 126, which is a signaling interface between the RAN nodes 106 and mobility management entities (MMEs).

Various embodiments address energy efficiency related issues for a cellular system such as wireless communications system 100. Energy saving is a critical issue for the 5G operators. Energy saving is achieved by activating the energy saving mode of the NR capacity booster cell or 5GC NF (e.g., a UPF etc.), and the energy saving activation decision making may be based on the various information such as load information of the related cells/UPFs, the energy saving policies set by operators as specified in a 3GPP TS or TR, such as TR 28.809, TR 37.817, TR 36.887, and TS 38.423.

A management system, node or logic has an overall view of network load information and it could also take the inputs from the control plane analysis (e.g., the analytics provided by NWDAF). The management system may provide network wide analytics and cooperate with core network and RAN domains and decide on which cell/UPF should move into energy saving mode in a coordinated manner.

There are various performance measurements could be used as inputs by MDA for energy saving analysis, for example, energy efficiency (EE) related performance measurements, (e.g. PDCP data volume of cells, PNF temperature, and PNF power consumption etc.) for the gNBs, and the data volume, number of PDU sessions with SSC mode 1, delay related measurements, and VR usage for UPFs, and the traffic load variation related performance measurements, (e.g. the PRB utilization rate, RRC connection number).

The composition of the traffic load could be also considered as inputs for energy saving analysis. (e.g., the percentage of high-value traffic in the traffic load). The variation of traffic load may be related to the network data (e.g., historical handover information of the UEs or network congestion status, packet delay). Collecting and analyzing the network data with machine learning tools may provide predictions related to the trends of traffic load. The composition and the trend of the traffic load may be used as references for making decision on energy saving.

There are many prediction data models which may use machine learning tools for predicting the energy saving related information, such as traffic load. MDAS may also take these prediction data models as input, make analysis and select the optimal prediction data models to provide more accurate prediction results as references for making energy saving decision. The more accurate the prediction results are, the better the energy-saving decision based on the prediction results will be. The prediction data models are related to services (e.g., traffic load, resource utilization, service experience), which can be provided by consumer.

MDAS may also obtain NF location or other inventory information such as energy efficiency and the energy cost of the data centers, while analyzing historical network information. Based on the collected information, MDAS producer makes analysis and gives suggestions to network management in optimization suggestion for 5G Core NF deployment options in high-value traffic region (e.g., location of VNF in context of energy saving). The information from control plane data analysis from NWDAF, such as UE Communication analytics may also be used as input for energy saving analysis and instruction.

The decision of core NF and RAN node energy saving should be coordinated by management system to guarantee the overall network and service performance are not affected as much as possible. To achieve an optimized balance between the energy consumed and the performance provided by the network, MDAS can be used to provide analytics reports by analyzing the above information comprehensively to assist the energy saving.

Figure 2:
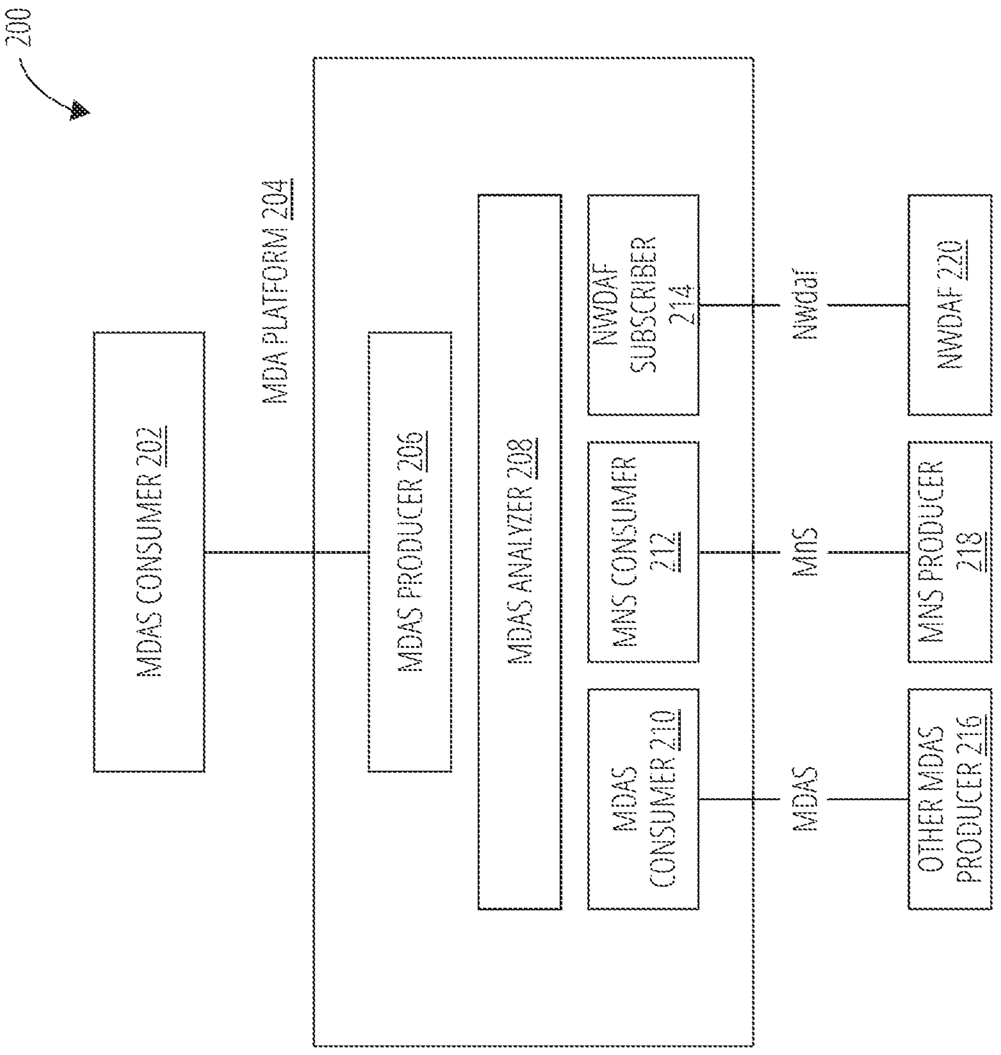
FIG. 2 illustrates a management data analytic (MDA) system in accordance with one embodiment.

FIG. 2 illustrates an MDA system 200 suitable for use by a management system to manage EE for the wireless communications system 100. The MDA system 200 illustrates a MDA functionality and service framework. As depicted in FIG. 2, the MDA system 200 may include a MDA platform 204, at least one MDA service (MDAS) consumer 202, and multiple MDAS producers, such as another MDAS producer 216, a management service (MnS) producer 218, and a network data analytics function (NWDAF) 220. The MDA platform 204 includes an MDAS producer 206, an MDAS analyzer 208, and multiple MDAS consumers. The multiple MDAS consumers include an MDAS consumer 210, an MnS consumer 212 and a NWDAF subscriber 214, each communicating with a corresponding other MDAS producer 216, MnS producer 218 and NWDAF 220 via a MDAS interface, MnS interface and Nwdaf interface, respectively.

In general, the MDA platform 204 may collect data for analysis by acting as the MnS consumer 212, and/or as the NWDAF subscriber 214, and/or as a consumer of the other MDAS producer 216. After analysis, the MDAS producer 206 exposes the analysis results to the one or more MDAS consumers 202. The MDA system 200 forms a part of a management loop (which can be open loop or closed loop), and it brings intelligence and generates value by processing and analysis of management and network data, where the AI and ML techniques may be utilized. The MDA system 200 plays the role of analytics in the management loop, which includes an observation state, an analytics state, a decision state and an execution state. In the observation state, the MDA system 200 conducts observation of the managed networks and services. The observation state involves monitoring and collection of events, status and performance of the managed networks and services, and providing the observed/collected data (e.g., performance measurements, Trace/MDT/RLF/RCEF reports, network analytics reports, QoE reports, alarms, etc). The data analytics state for the managed networks and services prepares, processes and analyzes the data related to the managed networks and services, and provides the analytics reports for root cause analysis of ongoing issues, prevention of potential issues and prediction of network or service demands. The analytics report contains the description of the issues or predictions with optionally a degree of confidence indicator, the possible causes for the issue and the recommended actions. Techniques such as AI and ML (e.g., ML model) may be utilized by the MDA platform 204 with the input data including not only the observed data of the managed networks and services, but also the execution reports of actions (taken by the execution step). The MDAS analyzer 208 classifies and correlates the input data (current and historical data), learns and recognizes the data patterns, and makes analysis to derive inference, insight and predictions. The decision state involves making decisions for the management actions for the managed networks and services. The management actions are decided based on the analytics reports (provided by the MDAS analyzer 208) and other management data (e.g., historical decisions made previously) if necessary. The decision may be made by the consumer of MDAS (in the closed management loop), or a human operator (in the open management loop). The decision includes what actions to take, and when to take the actions. Finally, the execution state involves execution of the management actions according to the decisions. During the execution state, the actions are carried out to the managed networks and services, and the reports (e.g., notifications, logs) of the executed actions are provided.

With respect to EE for the wireless communications system 100, the MDA system 200 can collect data such as various types of measurement information from one or more MDAS producers 206, such as implemented by a UE, a NG-RAN node, an operations, administration and maintenance (OAM) node, and other network nodes within the wireless communications system 100. The MDAS analyzer 208 can implement an AI and ML system to receive the measurement information, analyze the measurement information, and select an energy saving state for one or more MDAS consumers 202, such as a UE, a NG-RAN node, an OAM node, or other network nodes within the wireless communications system 100.

Figure 3:
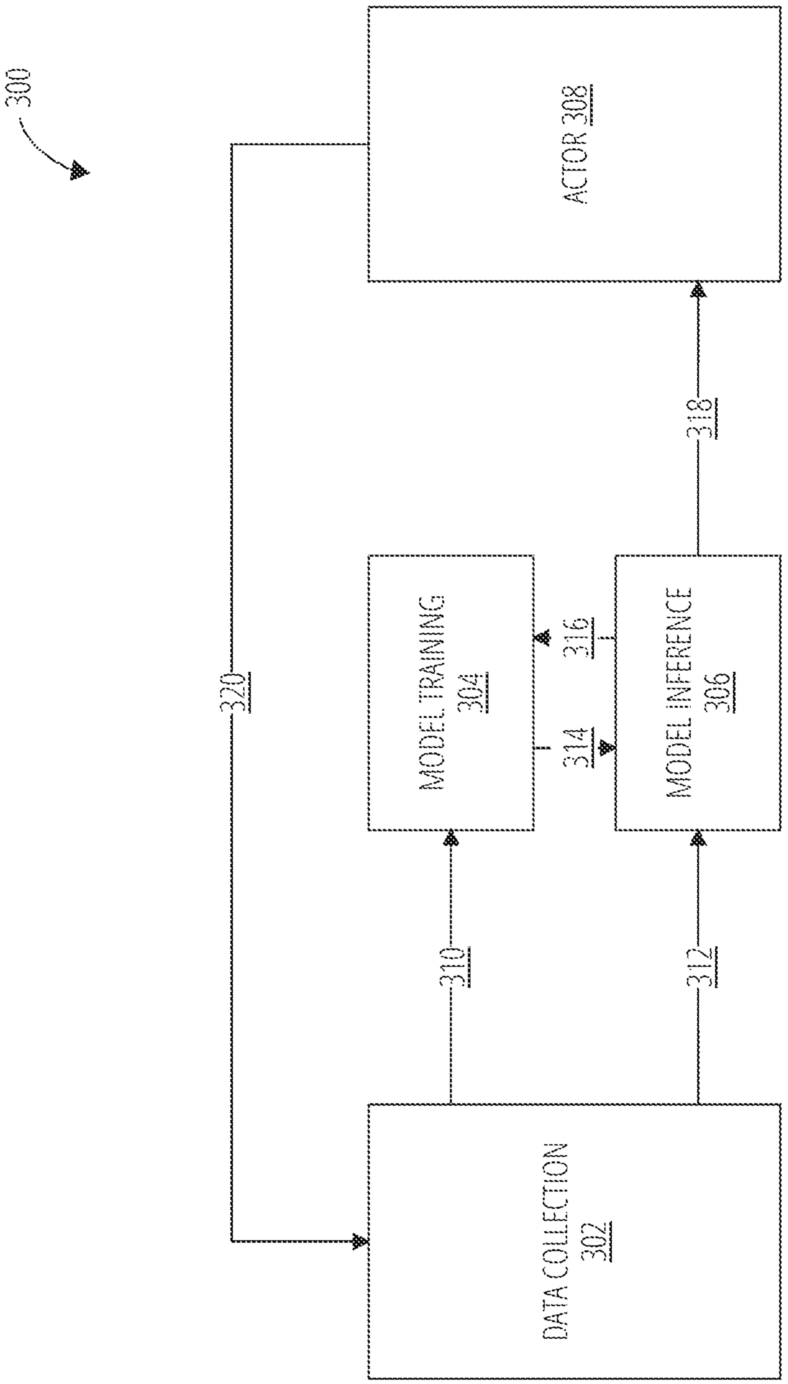
FIG. 3 illustrates an artificial intelligence (AI) system in accordance with one embodiment.

FIG. 3 illustrates an AI and ML system 300 suitable for use by the MDAS analyzer 208 of the MDA system 200 for the wireless communications system 100. The AI and ML system 300 comprises four major operational states, including a data collection state, an AI/ML model state, an AI/ML training state, and an AI/ML inference state.

The AI and ML system 300 may implement various AI and ML algorithms suitable for supporting energy savings operations for the wireless communications system 100. Machine learning approaches are traditionally divided into three broad categories, which correspond to learning paradigms, depending on the nature of the "signal" or "feedback" available to the learning system. One approach is supervised learning, where a computer is presented with example inputs and their desired outputs, given by a "teacher", and the goal is to learn a general rule that maps inputs to outputs. Another approach is unsupervised learning, where no labels are given to the learning algorithm, leaving it on its own to find structure in its input. Unsupervised learning can be a goal in itself (discovering hidden patterns in data) or a means towards an end (feature learning). Yet another approach is reinforcement learning, where a computer program interacts with a dynamic environment in which it must perform a certain goal (such as driving a vehicle or playing a game against an opponent). As it navigates its problem space, the program is provided feedback that's analogous to rewards, which it tries to maximize. Other approaches exist as well, such as dimensionality reduction, self learning, feature learning, sparse dictionary learning, anomaly detection, robot learning, association rules, and so forth.

The AI and ML system 300 may use various ML models. Performing machine learning involves creating a model, which is trained on some training data and then can process additional data to make predictions. The AI and ML system 300 may use various models or ML models, such as derived using an artificial neural network (ANN), convolutional neural network (CNN), deep learning, decision tree learning, support-vector machine, regression analysis, Bayesian networks, genetic algorithms, federated learning, distributed artificial intelligence, and other suitable models. Embodiments are not limited in this context.

Generally, in the data collection state, the AI and ML system 300 implements a function that provides input data to model training and model inference functions. Note AI/ML algorithm specific data preparation (e.g., data pre-processing and cleaning, formatting, and transformation) is typically not carried out in the data collection state. In the AI/ML model state, the AI and ML system 300 implements a data driven algorithm by applying machine learning techniques that generates a set of outputs comprising predicted information and/or decision parameters, based on a given set of inputs 310. In the AI/ML training state, the AI and ML system 300 implements an online or offline process to train an AI/ML model by learning features and patterns that best present data and get the trained AI/ML model for inference. In the AI/ML inference state, the AI and ML system 300 implements a process of using a trained AI/ML model to make a prediction or guide the decision based on collected data and the AI/ML model.

More particularly, in the data collection state, the AI and ML system 300 collects data from the network nodes, management entity or UE, as a basis for AI/ML model training, data analytics and inference. As depicted in FIG. 3, a data collection 302 is a function that provides input data to model training 304 and model inference 306 functions. An AI/ML algorithm specific data preparation (e.g., data pre-processing and cleaning, formatting, and transformation) is not carried out in the data collection 302. Examples of input data may include measurements from UEs, NG-RAN nodes, OAM nodes, or different network entities, feedback from an actor 308, and output from an AI/ML model. The data collection 302 collects at least two types of data. The first is training data, which comprises data needed as input 310 for the AI/ML model training 304 function. The second is inference data, which comprises data needed as input 312 for the AI/ML model inference 306 function.

In the model training state, the model training 304 is a function that performs the AI/ML model training, validation, and testing which may generate model performance metrics as part of the model testing procedure. The model training 304 function is also responsible for data preparation (e.g., data pre-processing and cleaning, formatting, and transformation) based on training data (e.g., input 310) delivered by the data collection 302 function, if required. For deployment or updates to a given ML model, the model training 304 can initially deploy a trained, validated, and tested AI/ML model to the model inference 306 function or to deliver an updated model to the model inference 306 function.

In the model inference state, the model inference 306 is a function that provides AI/ML model inference output (e.g., predictions or decisions). The model inference 306 function may provide model performance feedback 314, 316 to the model training 304 function when applicable. The model inference 306 function is also responsible for data preparation (e.g., data pre-processing and cleaning, formatting, and transformation) based on inference data (e.g., input 312) delivered by the data collection 302 function, if required. The inference output of the AI/ML model produced by a model inference 306 function is use case specific. The model performance feedback information may be used for monitoring the performance of the AI/ML model, when available.

In the actor inference state, the actor 308 is a function that receives the output 318 from the model inference 306 function and triggers or performs corresponding actions. The actor 308 may trigger actions directed to other entities or to itself. The actor 308 may provide feedback information 320 to the data collection 302. The feedback information may comprise data needed to derive training data, inference data or to monitor the performance of the AI/ML Model and its impact to the network through updating of KPIs and performance counters.

The AI and ML system 300 may be applicable to various use cases and solutions for AI in a RAN node 106 of the wireless communications system 100. One use case is network energy saving or EE. To meet the 5G network requirements of key performance and the demands of the unprecedented growth of the mobile subscribers, millions of base stations (BSs) are being deployed. Such rapid growth brings the issues of high energy consumption, $CO_2$ emissions and operation expenditures (OPEX). Therefore, energy saving is an important use case which may involve different layers of the network, with mechanisms operating at different time scales.

Cell activation/deactivation is an energy saving scheme in the spatial domain that exploits traffic offloading in a layered structure to reduce the energy consumption of the whole RAN. When the expected traffic volume is lower than a fixed threshold, the cells may be switched off, and the served UEs may be offloaded to a new target cell. Efficient energy consumption can also be achieved by other means such as reduction of load, coverage modification, or other RAN configuration adjustments. The optimal energy saving decision depends on many factors including the load situation at different RAN nodes, RAN nodes capabilities, KPI/QoS requirements, number of active UEs and UE mobility, cell utilization, etc. However, the identification of actions aimed at energy efficiency improvements is not a trivial task. Wrong switch-off of the cells may seriously deteriorate the network performance since the remaining active cells need to serve the additional traffic. Wrong traffic offload actions may lead to a deterioration of energy efficiency instead of an improvement. The current energy-saving schemes are vulnerable to potential issues such as inaccurate cell load prediction. Currently, energy-saving decisions rely on current traffic load without considering future traffic load. Another vulnerability is conflicting targets between system performance and energy efficiency. Maximizing the system's key performance indicator (KPI) is usually done at the expense of energy efficiency. Similarly, the most energy efficient solution may impact system performance. Thus, there is a need to balance and manage the trade-off between the two. Another vulnerability is conventional energy-saving related parameters adjustment. Energy-saving related parameters configuration is set by traditional operation, e.g., based on different thresholds of cell load for cell switch on/off which is somewhat a rigid mechanism since it is difficult to set a reasonable threshold. Another vulnerability are those actions that may produce a local (e.g., limited to a single RAN node) improvement of EE, while producing an overall (e.g., involving multiple RAN nodes) deterioration of EE.

To deal with issues listed above, ML techniques could be utilized to optimize the energy saving decisions by leveraging on the data collected in the RAN network. ML algorithms may predict the energy efficiency and load state of the next period, which can be used to make better decisions on cell activation/deactivation for energy saving, as well as other potential power saving states, such as those defined by 3GPP TR 36.887 and 3GPP TR 37.817, among other 3GPP TSs and/or TRs. Based on the predicted load, the system may dynamically configure the energy-saving strategy (e.g., the switch-off timing and granularity, offloading actions) to keep a balance between system performance and energy efficiency and to reduce the energy consumption.

Figure 4:
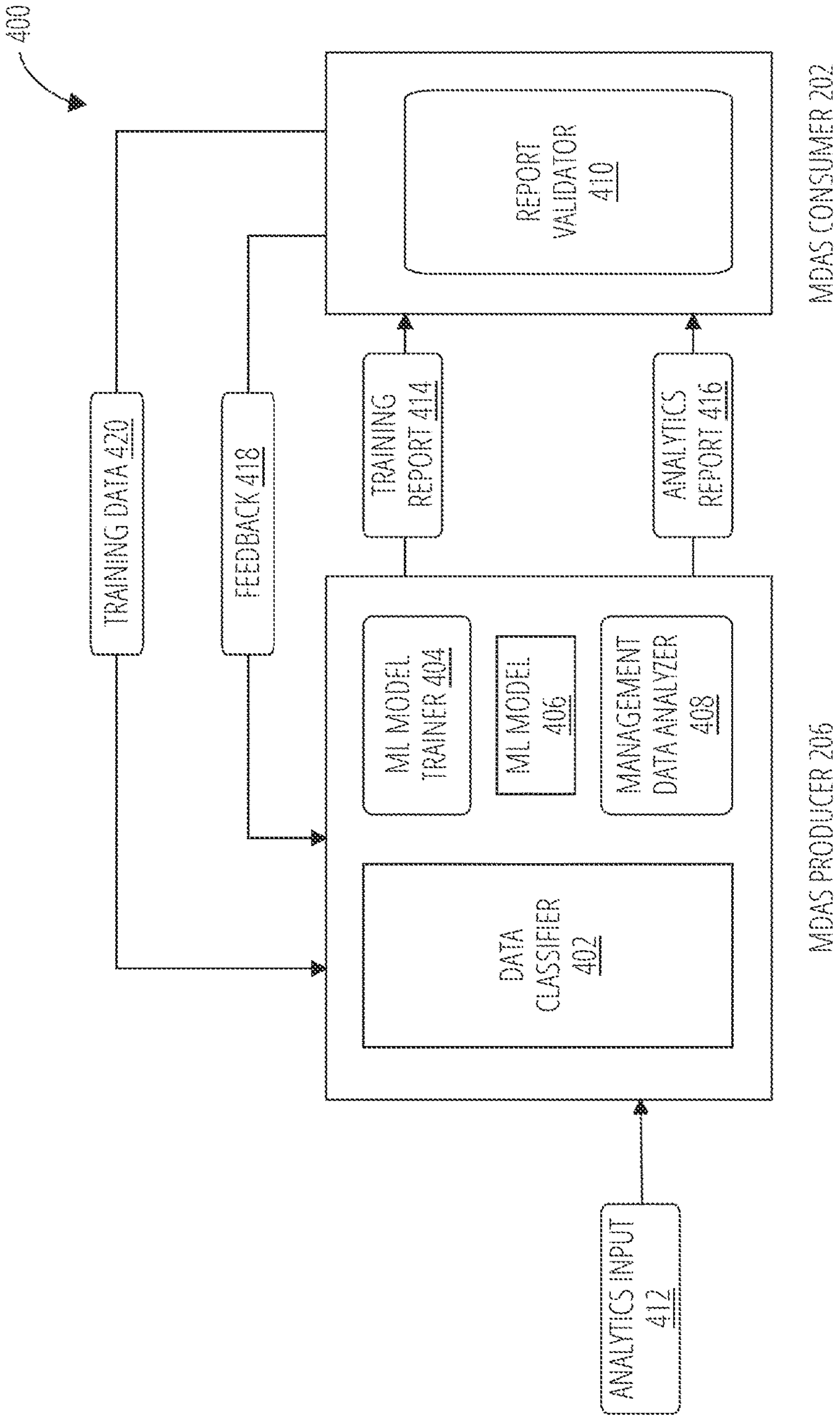
FIG. 4 illustrates an MDA machine learning (ML) system in accordance with one embodiment.

FIG. 4 illustrates an MDA ML system 400 suitable for use in the wireless communications system 100. Referring again to FIGS. 2, 3, a management system that implements the MDA system 200 and/or the AI and ML system 300 can be coalesced into the MDA ML system 400.

As depicted in FIG. 4, the MDA ML system 400 illustrates an example of a MDA process scenario where the ML model and the management data analysis module are residing in a MDAS producer, although other scenarios are possible. The MDA ML system 400 may generally rely on ML technologies, which may need a MDAS consumer to be involved to optimize the accuracy of the MDA results. The MDA process in terms of the interaction with the MDAS consumer, when utilizing ML technologies, is described in FIG. 4.

There are two kinds of processes for MDA, a process for ML model training and a process for management data analysis. In the process for ML model training, an MDAS producer 206, trains an ML model 406 and provides an ML training report 414. The process for ML model training may also get an MDAS consumer 202 involved, by allowing the MDAS consumer 202 to provide input for ML model training. The ML model training may be performed on an un-trained ML model 406 or a trained ML model 406. In the process for management data analysis, the MDAS producer 206 analyzes the data by the trained ML model, and provides an ML analytics report 416 to the MDAS consumer 202. The MDAS consumer 202 may validate the training report 414 and analytics report 416 and provide a report validation feedback 418 to the MDAS producer 206. For each received report the MDAS consumer 202 may provide a feedback 418 towards the MDAS producer 206, which may be used to optimize ML model 406.

As depicted in FIG. 4, the MDAS producer 206 may receive analytics input 412. The analytics input 412 could be used by an ML model trainer 404 for ML model training or a management data analyzer 408 for management data analysis. A data classifier 402 of the MDAS producer 206 classifies data from the analytics input 412 and passes the classified data along to a corresponding entity for further processing.

A ML model trainer 404 of the MDAS producer 206 trains the ML model 406. The ML model trainer 404 trains the ML algorithm of the ML model 406 to be able to provide the expected training output by analysis of the training input. The data for ML model training may be training data, including the training input and the expected output, and/or the report validation feedback 418 provided by the MDAS consumer 202. After training the ML model 406, the MDAS producer 206 provides an ML model training report 414 to the MDAS consumer 202.

The trained ML model 406 analyzes the classified data from the data classifier 402, and it generates the management data analytics reports 416. The analytics reports 416 are output from the MDAS producer 206 to the MDAS consumer 202. The MDAS consumer 202 may validate the analytics report 416 provided by the MDAS producer 206. The analytics report 416 to be validated may be the analytics report 416 and/or the ML model training report 414 as previously described. The MDAS consumer 202 may provide a feedback 418 to the MDAS producer 206. As a result of validation, the MDAS consumer 202 may also provide training data and request to train the ML model and/or provide feedback indicating a scope of inaccuracy, e.g. time, geographical area, etc.

When the MDA ML system 400 is implemented as part of a network node in a 3GPP system, such as a 3GPP RAN3 5G NR system, various embodiments herein describe new information that a RAN node may exchange with its neighboring nodes as well as other metrics of a cell KPIs and AI/ML models in order to facilitate better decision making from the AI/ML models for system energy savings. As previously discussed, current 3GPP 5G NR systems are limited to only two possible energy savings states, namely cell activation and cell deactivation. However, additional possible energy savings states are defined in 3GPP TR 36.887. It relies on techniques which depend on vendor specific hardware implementation and deployment such as improved cell hardware, antenna muting, micro discontinuous transmission (DTX), and adaptive sectorization. As mentioned earlier, however, the impact of these additional mechanisms has not yet been incorporated into RAN energy savings solutions. This leads to very limited solutions that can only be applied under conditions such as when the cell experiences no load, such as at nighttime, but doesn't take advantage of low usage levels during the daytime low usage levels.

In addition, currently there is limited information exchanged between the RAN nodes and the OAM or among the RAN nodes themselves for training AI models, which could lead to poor outcomes such as lower energy savings than are possible, loss of network coverage due to inaccurate AI model prediction. In an attempt to solve these and other challenges, embodiments provide solutions that may include one or more of the following techniques.

A first technique is expanded input/output (I/O) information for the AI/ML models. Given that base stations have many possible mechanisms in addition to cell activation or cell deactivation to save energy, embodiments define ways where such mechanisms may impact the service capabilities of the base station and in turn affect the energy saving strategy and handover strategies of neighboring cells.

A second technique is enhancing AI/ML model accuracy data. Embodiments define mechanisms to ensure that predicted information provided by various AI/ML models is accompanied with metrics to allow a network node, such as an OAM or RAN node, to know accuracy and error bounds for various training reports 414 or analytics reports 416. This will allow individual RAN nodes or OAM nodes to make better decisions under currently prevailing conditions. Also, it helps to improve the existing AI/ML models, such as ML model 406 of the MDA ML system 400.

A third technique is providing periodic feedback for further model training. Feedback information, such as feedback 418, from each RAN node 106 may be set at a periodic interval in order to ensure that the RAN node 106 is still able to maintain compliance with a set of KPIs for UEs at a chosen power saving strategy, and further, ensure resulting actions (e.g., such as a HO strategy) are correctly selected by tracking feedback from a target NG-RAN node.

Various embodiments as described herein may provide information exchange to enable system energy savings which is an important consideration for 5G and beyond 5G network deployment. Embodiments may enable power efficient platforms and systems solutions. For network energy savings, a given cell may implement different levels of energy saving states beyond simple cell activation and cell deactivation. Each energy saving state may correspond to different types of actions in the cell, depending on its capability and configuration. By way of example, and not limitation, a cell may implement a number of different energy saving states beyond cell activation or cell deactivation, such as the following ten energy saving states: (1) increase System Synchronization Block (SSB) periodicity; (2) lower the advertised Bandwidth (use Bandwidth Part Adaptation (BPA) feature; (3) DTX for a BS or eNB or gNB; (4) increase a System Information Block (SIB) periodicity; (5) use wake-up signaling features and/or DRX features to increase a number of UEs and/or an amount of time spent in sleep mode, depending on UE traffic patterns; (6) carrier aggregations turn on and/or off; (7) secondary cell activation and/or deactivation; (8) primary/macro cell activation/deactivation; (9) turn off dual connectivity; and/or (10) turn off pico cells/small cells and just keep macro cells activated or vice versa.

For energy saving states 1-6, the cell may not necessarily be deactivated, but some of its KPIs may be suitable for lower QoS applications. For example, a handover (HO) decision to transfer a UE to another cell may be dependent on whether a cell can still fulfill the application QoS, such as for some highly latency-sensitive applications running on UEs within the cell at a chosen or proposed lower power saving state. This could be applicable for existing as well as any new UEs entering the system. In this case, output of an AI/ML model may be a recommendation to remain in low power state and transfer the UE to a neighboring node. Thus, the decision to HO to another cell may still need to happen in this case.

For the actions in energy saving sates 1-6 to occur, a cell may need to advertise an impact of changing a power state on KPIs for each energy state. Example KPIs may include current/predicted cell capacity, current/predicted average cell throughput, current/predicted resource availability, current/predicted number of UEs a cell can handle, current/predicted average time for a UE to connect to the cell from idle state, current CQI information, current mobility information of UEs, predicted UE latency and predicted UE throughput, and other KPIs. A cell may or may not need to transfer a UE to another cell as it is still providing service or it may still do that in case an application running on the cell has a QoS that is latency sensitive and it is impacted by longer connect times. For example, if a UE or multiple UEs moves from a first RAN node (RAN node 1) to a second RAN node (RAN node 2), then a potential impact on QoS of the handed over or already existing UE/UEs in both RAN node 1 and RAN node 2 should be taken into account when deciding an action to take for energy saving. If this is already supported by SON, then no further action is necessary, otherwise the functionality may need to be added.

To implement the energy saving states 1-6 in a RAN node, a cell in the RAN node may need to communicate which level of energy saving state applies and also corresponding performance/KPI impact to a corresponding RAN node. Inter-node communication regarding this performance impact is missing presently from 3GPP systems, and embodiments provide several solutions to facilitate the requisite inter-node communication.

For energy saving states 7-10, a cell may be entirely de-activated, so HO is more likely. However, a network node may need to share information as specified in the above list. The cell may also communicate potential time to turn on in case the load starts to rise and a threshold value to enable this.

FIGS. 5-12 outline a number of logic flows and message flows to enable information exchange, ML model training and ML model inference, and feedback mechanisms suitable for transport of measurement information, feedback information, and other types of information related to EE for various network nodes of a 3GPP system. In particular, FIGS. 5-10 illustrate two potential solutions for power saving, load balancing and mobility optimization use cases. A first solution describes split-node ML model, where ML model training is performed at an OAM node and ML model inference is performed at an NG-RAN node, as described with reference to FIGS. 7-10. A second solution describes a single node model, where ML model training and ML model inference is performed by a NG-RAN node, as described with reference to FIGS. 5-6. It may be appreciated that ML training and ML inference may be implemented by more than two network nodes as well, such as by an OAM node and multiple NG-RAN nodes, for example. Embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 5:
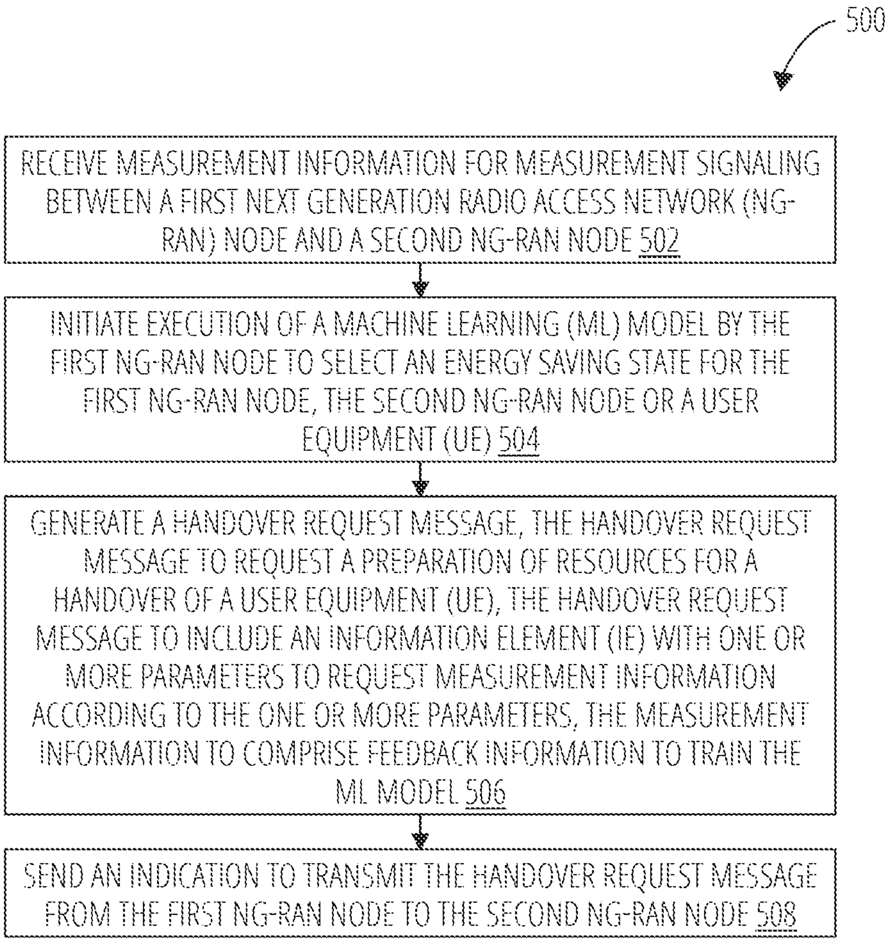
FIG. 5 illustrates a first logic flow in accordance with one embodiment.

FIG. 5 illustrates an embodiment of a logic flow 500. The logic flow 500 may be representative of some or all of the operations executed by one or more embodiments described herein. For example, the logic flow 500 may include some or all of the operations performed by the MDA ML system 400 of the wireless communications system 100. More particularly, the logic flow 500 illustrates the second solution for a power saving use case, where feedback information is configured (e.g., requested and received) in preparation for a handover operation for a UE between cells. Embodiments are not limited in this context.

In block 502, logic flow 500 receives measurement information for measurement signaling between a first next generation radio access network (NG-RAN) node and a second NG-RAN node. For example, the first NG-RAN node may implement an MDA ML system 400 with a ML model 406 that receives measurement information for measurement signaling between the first NG-RAN node and the second NG-RAN node.

In block 504, logic flow 500 initiates execution of a machine learning (ML) model by the first NG-RAN node to select an energy saving state for the first NG-RAN node, the second NG-RAN node or a user equipment (UE). For example, the MDAS producer 206 of the MDA ML system 400 of the first NG-RAN node may initiate execution of the ML model 406 in order to select an energy saving state for the first NG-RAN node, the second NG-RAN node or a UE operating in the first or second NG-RAN node. The selected energy saving state may be one of energy saving states 1-10 as previously described.

In block 506, logic flow 500 generates a handover request message, the handover request message to request a preparation of resources for a handover of a user equipment (UE), the handover request message to include an information element (IE) with one or more parameters to request measurement information according to the one or more parameters, the measurement information to comprise feedback information to train the ML model. For example, the first NG-RAN node may generate a handover request message, the handover request message to request a preparation of resources for a handover of a UE. The handover request message may include an IE with one or more parameters to request measurement information according to the one or more parameters, the measurement information to comprise feedback information to train the ML model 406 of the MDAS producer 206.

In block 508, logic flow 500 sends an indication to transmit the handover request message from the first NG-RAN node to the second NG-RAN node. For example, the first NG-RAN node sends an indication to transmit the handover request message from the first NG-RAN node to the second NG-RAN node over a signaling interface, such as a 3GPP XnAP signaling interface.

Figure 6:
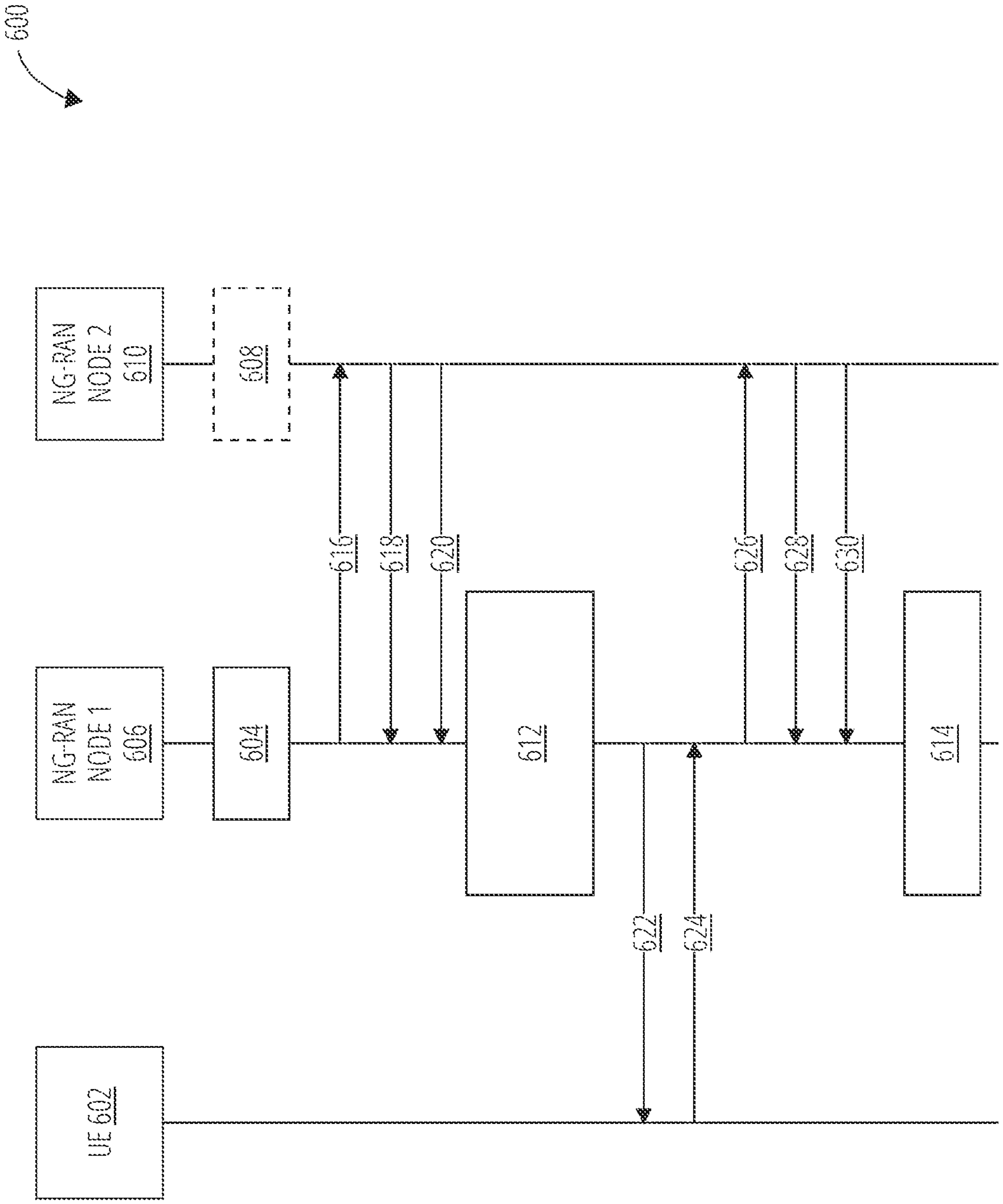
FIG. 6 illustrates a first message flow in accordance with one embodiment.

FIG. 6 illustrates a message flow 600. The message flow 600 illustrates a series of message exchanges between a UE 602, a first NG-RAN node 1 606, and a second NG-RAN node 2 610. The message flow 600 may enable or support the second solution which describes power saving, load balancing and/or mobility optimization implemented as a single node model for an AI/ML implementation.

To deal with energy saving issues previously described above, various ML techniques are utilized to optimize energy saving decisions by leveraging on the data collected in a NG-RAN network. The ML algorithms may predict an energy efficiency and load state for a next period, which can be used to make better decisions on selecting an energy saving state for various devices within the NG-RAN network, such as the UE 602, the first NG-RAN node 1 606, the second NG-RAN node 2 610, and other network nodes. Based on a predicted load, the system may dynamically configure the energy-saving strategy (e.g., the switch-off timing and granularity, offloading actions) to keep a balance between system performance and energy efficiency and to reduce the energy consumption.

To facilitate and support energy-saving decisions, the message flow 600 may communicate messages to request and receive measurement information, such as feedback information, needed as input for an AI/ML model training function and/or an AI/ML model inference function, such as those described with reference to the AI and ML system 300 of FIG. 3 and/or the MDA ML system 400 of FIG. 4, to facilitate an energy savings strategy or EE for the wireless communications system 100.

As depicted in the message flow 600, at block 604, the NG-RAN node 1 606 implements an MDAS producer 206 with an ML model trainer 404 to perform ML model training operations for an ML model 406, and a management data analyzer 408 to use the trained ML model 406 to perform ML model inference operations (e.g., similar to the model inference 306 of the AI and ML system 300 described with reference to FIG. 3), as described with reference to the logic flow 500 of FIG. 5. In other words, both AI/ML model training and AI/ML model inference operations are located in a single gNB. In case of central unit (CU)-distributed unit (DU) split architecture, the AI/ML model training and the AI/ML model inference may both be located in the gNB-CU or the gNB-DU, or separately in the gNB-CU and gNB-DU, or separately in the gNB-CU and some other network node such as an OAM node. Embodiments are not limited in this context.

At block 608, the NG-RAN node 2 610 may optionally implement an independent MDAS producer 206, or a portion of an MDAS producer 206 to cooperatively interact with a portion of an MDAS producer 206 implemented by the NG-RAN node 1 606. The exemplary message flow 600 supports the former implementation, where the NG-RAN node 1 606 implements the MDAS producer 206. In this solution, the NG-RAN node 1 606 makes energy decisions using the AI/ML model trained at the NG-RAN node 1 606.

The NG-RAN node 1 606 sends a message 616 to the NG-RAN node 2 610. The message 616 may represent a resource status request message or a predicted resource status request message. The NG-RAN node 2 610 sends a message 618 to the NG-RAN node 1 606. The message 618 may represent a resource status response or a predicted resource status response message. The NG-RAN node 2 610 periodically sends a message 620 to the NG-RAN node 1 606. The message 620 may represent a resource status update message.

At block 612, the MDAS producer 206 uses the ML model 406 to perform ML model inference operations to select an energy saving state for the UE 602, the NG-RAN node 1 606, the NG-RAN node 2 610, or some other network node of the wireless communications system 100. In the case of selecting an energy saving state for the UE 602 at block 612, the NG-RAN node 1 606 sends a message 622 to the UE 602. The message 622 may represent a resource radio control (RRC) reconfiguration message when a handover (HO) for the UE 602 is selected as the energy saving strategy by the ML model 406. The UE 602 sends a message 624 to the NG-RAN node 1 606. The message 624 may represent a UE measurement report with measurement information measured by the UE 602 in response to a request for measurement of a measurement object. The NG-RAN node 1 606 sends a message 626 to the NG-RAN node 2 610. The message 626 may represent a handover request message or a predicted handover request message, that also carries configuration information based on the measurement information, or feedback, from the UE 602 in the message 624. The NG-RAN node 2 610 sends a message 628 to the NG-RAN node 1 606. The message 628 may represent a handover request acknowledgement message or a predicted handover request acknowledgement message. The NG-RAN node 2 610 periodical sends a message 630 to the NG-RAN node 1 606. The message 630 may represent measurement information, or feedback information, for the ML model 406. At block 614, the MDAS producer 206 uses the feedback information as input for the ML model 406 to assist in ML training of the ML model 406, to provide better predictions or estimates for future energy saving states for various network nodes of the wireless communications system 100.

By way of example, 3GPP TR 28.809 defines feedback information from the NG-RAN node 1 606 to an OAM or feedback information from a target NG-RAN node to a source NG-RAN node after HO occurs due to power saving or mobility optimization. For instance, content for the feedback information can be related to a UE HO decision and corresponding success/failure, current cell capacity, current average cell throughput, current resource availability, actual energy saving observed once the energy saving decision is taken, and other measurement objects. The feedback information may also include error statistics as observed in the different AI/ML models. The error statistics could include a cumulative distribution function (CDF) information or CDF histogram of the observed error in the AI/ML models. The feedback information can be used for further training of the ML model 406, either locally at the NG-RAN node 1 606 or at another network node (e.g., an OAM) to better predict the success/failure of the ML model 406 output.

One or more NG-RAN nodes may need to provide feedback information to the OAM at some periodic intervals in order to ensure that it is still able to maintain the KPIs (e.g., average cell throughput and etc) for all the UEs in its coverage at the chosen power saving strategy, as discussed with reference to FIGS. 11 and 12. Similarly, the target NG-RAN may need to provide periodical feedback to the source NG-RAN to ensure the HO strategy is correctly selected by the source NG-RAN node. Examples for the HO strategy may include how many UEs will be HO, to which node the UE will be HO, which UE will be HO, and so forth.

In the case of solution 2, where both ML model training and ML model inference are implemented at the NG-RAN node 1 606, the first NG-RAN node 1 606 may receive feedback 418 from the second NG-RAN node 2 610. Configuration information to receive the feedback 418 may be communicated in the messages 616, 618 and/or 620 prior to the MDAS producer 206 selecting an energy saving decision strategy at the block 612.

Referring again to FIG. 6, the NG-RAN node 1 606 sends a message 616 to the NG-RAN node 2 610. The message 616 may represent a resource status request message or a predicted resource status request message. In one embodiment, the resource status request message may be implemented as a RESOURCE STATUS REQUEST message as defined in Section 9.1.3.18 of the 3GPP TS 38.423 titled "Study of Technical Specification Group Radio Access Network; NG-RAN; Xn application protocol (XnAP)" Release 17 version 17.1.0 (2022-06), including any progeny, revisions and variants. Other message types and standards may be implemented as well. Embodiments are not limited in this context.

An example of how new information elements (IEs) are added in a RESOURCE STATUS REQUEST message to support periodic feedback for ML model training is shown in Table 1 as follows:

9.1.3.18 Resource Status Request

This message is sent by NG-RAN $node_1$ to NG-RAN node, to initiate the requested measurement according to the parameters given in the message.

Direction: NG-RAN $node_1$→NG-RAN $node_2$.

TABLE 1

| IE/Group Name | Presence | IE type and reference | Semantics description | Criticality | Assigned Criticality |
|---|---|---|---|---|---|
| Message Type | M | 9.2.3.1 | | YES | reject |
| NG-RAN node1 Measurement ID | M | INTEGER (1 . . . 4095, . . . ) | Allocated by NG-RAN $node_1$ | YES | reject |
| NG-RAN node2 Measurement ID | C-ifRegistrationRequestStoporAdd | INTEGER (1 . . . 4095, . . . ) | Allocated by NG-RAN $node_2$ | YES | ignore |
| Registration Request | M | ENUMERATED(start, stop, add, . . . ) | Type of request for which the resource status is required. | YES | reject |
| Report Characteristics | C-ifRegistrationRequestStart | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Sixth Bit = Avg. Cell Throughput Seventh Bit = Predicted avg. throughput over Interval X Eighth Bit = Confidence level of predicted information Ninth Bit = Avg. time for UE to connect to cell $10^{th}$ Bit = Quantized Histogram of AI/model error Other bits shall be ignored by the NG-RAN node2. | YES | reject |
| . . . | . . . | | | | |
| . . . | . . . | | | | |
| Reporting Periodicity | O | ENUMERATED(500 ms, 1000 ms, 2000 ms, 5000 ms, 10000 ms, . . . 1 min, 5 min, 10 min) | Periodicity that can be used for reporting of PRB Periodic, TNL Capacity Ind Periodic, Composite Available Capacity Periodic. Also used as the averaging window length for all measurement object if supported. | YES | Ignore |
| Prediction Interval | O | ENUMERATED(5 min, 10 min, 30 min, 60 min . . . ) | If the Seventh and Eighth bit is present, then this IE indicates the interval over which the prediction has been made | YES | Ignore |
| Confidence Level of the Prediction | O | ENUMERATED(0, 100) | If the Seventh and Ninth bit is present, then this IE indicates the confidence level of the predicted info | | |
| Quantized Histogram of AI/model error | O | ENUMERATED(0-10%, 10-20%, . . . 90-100%) | If the Seventh and $10^{th}$ bit is present, then this IE indicates the distribution of the AI/model error | | |
| Avg. time for UE to connect to cell | O | ENUMERATED(20 ms, 40 ms, 60 ms, 80 ms, 100 ms, 120 ms, 160 ms, 200 ms) | If the Ninth bit is present, then this IE indicates the average amount of time it takes a UE to be able to connect to the cell | | |

TABLE 1-continued

| IE/Group Name | Presence | IE type and reference | Semantics description | Criticality | Assigned Criticality |
|---|---|---|---|---|---|
| Feedback stop trigger for ML training | O | ENUMERATED (specific time duration, UE goes to idle, UE HO to 3rd cell, . . . | It is present only when Reporting Periodicity is present. | | |
| >Feedback duration | O | ENUMERATED(10 s, 100 s, . . . | Present when Feedback stop triggering for ML training is set as "specific time duration" | | |
| >UE INFO | O | | Present when Feedback stop triggering for ML training is set as "UE goes to idle" or "UE HO to 3rd cell" | | |

Referring again to FIG. 6, the NG-RAN node 2 610 sends a message 618 to the NG-RAN node 1 606. The message 618 may represent a resource status response or a predicted resource status response message. In one embodiment, the resource status response message may be implemented as a RESOURCE STATUS RESPONSE message as defined in Section 9.1.3.19 of the 3GPP TS 38.423 titled "Study of Technical Specification Group Radio Access Network; NG-RAN; Xn application protocol (XnAP)" Release 17 version 17.1.0 (2022-06), including any progeny, revisions and variants. Other message types and standards may be implemented as well. Embodiments are not limited in this context.

The 3GPP TS 38.423 defines a RESOURCE STATUS RESPONSE message as a message that is sent by NG-RAN node$_2$ to NG-RAN node$_1$ (e.g., NG-RAN node 2 610 to NG-RAN node 1 606) to indicate that the requested measurement, for all of the measurement objects included in the measurement, is successfully initiated.

Corresponding to the RESOURCE STATUS REQUEST message and the RESOURCE STATUS RESPONSE message, a RESOURCE STATUS UPDATE message is also updated to reflect the measurements for the requested additional parameters. For example, the NG-RAN node 2 610 may periodically send a message 620 to the NG-RAN node 1 606. The message 620 may represent a resource status update message. In one embodiment, the resource status update message may be implemented as a RESOURCE STATUS UPDATE message as defined in Section 9.1.3.21 of the 3GPP TS 38.423 titled "Study of Technical Specification Group Radio Access Network; NG-RAN; Xn application protocol (XnAP)" Release 17 version 17.1.0 (2022-06), including any progeny, revisions and variants. Other message types and standards may be implemented as well. Embodiments are not limited in this context.

An example of how new information elements (IEs) are added in a RESOURCE STATUS UPDATE message to support periodic feedback for ML model training is shown in Table 2 as follows:

9.1.3.21 Resource Status Update

This message is sent by NG-RAN node$_2$ to NG-RAN node$_1$ to report the results of the requested measurements.

Direction: NG-RAN node$_2$→NG-RAN node$_1$.

TABLE 2

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . .) | Allocated by NG-RAN node$_1$ | YES | reject |
| NG-RAN node2 Measurement ID | M | | INTEGER (1 . . . 4095, . . .) | Allocated by NG-RAN node$_2$ | YES | reject |
| Cell Measurement Result | | 1 | | | YES | ignore |
| >Cell Measurement Result Item | | 1 . . . <maxnoofCellsinNG-RANnode> | | | YES | ignore |
| >>Cell ID | M | | Global NG-RAN Cell Identity 9.2.2.27 | | — | |
| >>Radio Resource Status | O | | | | — | |
| >>TNL Capacity Indicator | O | | | | — | |
| >>Composite Available Capacity Group | O | | | | — | |
| >>Slice Available Capacity | O | | | | — | |
| >>Number of Active UEs | O | | | | — | |
| >> RRC Connections | O | | | | — | |

TABLE 2-continued

| IE/Group Name | Presence | Range | IE type and reference | Semantics description | Criticality | Assigned Criticality |
|---|---|---|---|---|---|---|
| >>Predicted avg. throughput over Interval X | | | | | | |
| >>Prediction Interval | O | | | | | |
| >>Confidence Level of the Prediction | O | | | | | |
| >> Quantized Histogram of AI/model error | O | | | | | |
| >>Avg. time for UE to connect to cell | O | | | | | |
| >>Avg. Cell Throughput | | | | | | |
| >>UE INFO | O | | | | | |

As presented in Table 2, a prediction interval denotes the confidence interval of the predicted value from one or more NG-RAN nodes. A confidence level of the prediction is important information as well, as it denotes a percentage confidence that a prediction provided by the one or more NG-RAN nodes is correct. The confidence level should incorporate an average error in the prediction as well. A minimum confidence level threshold can be included in the information as well. A quantized histogram of error provides further details on the AI modeling error and is very useful for further AI model training.

The "UE INFO" IE indicates the UE which is handover from a source NG-RAN node to a target NG-RAN node due to power saving. Information for the UE INFO IE may be defined with an IE group name of "NG-C UE associated Signaling reference" as defined in 3GPP TS 38.423, Section 9.1.1.1, HANDOVER REQUEST message, as shown in Table 3 below, or other appropriate information to identify a specific UE which is handover to a target NG-RAN.

TABLE 3

| IE/Group Name | Presence | IE type and reference | Semantics Description |
|---|---|---|---|
| >NG-C UE associated Signalling reference | M | AMF UE NGAP ID 9.2.3.26 | Allocated at the AMF on the source NG-C connection. |

In case of solution 2, where both ML model training and ML model inference are implemented at the NG-RAN node 1 606, the first NG-RAN node 1 606 may receive feedback 418 from the second NG-RAN node 2 610. Configuration information to receive the feedback 418 may be communicated during handover preparations. For example, a periodic interval is set by the source NG-RAN node and sent to the target NG-RAN node during the HO preparation, as depicted in FIG. 6. The impact to the target NG-RAN node is due to UE HO so there is no need to keep sending feedback information from the target NG-RAN node to the source NG-RAN node after the UE 602 to perform HO goes to idle or the UE 602 is HO again to a third NG-RAN node 3 (not shown). Because the source NG-RAN does not know when the UE 602 in HO will go to idle or HO again to the third NG-RAN node 3, it could set a feedback stop trigger, such as "stop feedback after the HO UE goes to idle state" or "stop feedback after the HO UE handover to a 3rd node," in order to stop the feedback information from the target NG-RAN node.

Referring again to FIG. 6, the NG-RAN node 1 606 sends a message 626 to the NG-RAN node 2 610. The message 626 may represent a handover request message or a predicted handover request message, that also carries configuration information based on the measurement information, or feedback, from the UE 602 in the message 626. In one embodiment, the handover request message may be implemented as a HANDOVER REQUEST message as defined in Section 9.1.1.1 of the 3GPP TS 38.423 titled "Study of Technical Specification Group Radio Access Network; NG-RAN; Xn application protocol (XnAP)" Release 17 version 17.1.0 (2022-06), including any progeny, revisions and variants. Other message types and standards may be implemented as well. Embodiments are not limited in this context.

An example of how new information elements (IEs) are added in a HANDOVER REQUEST to support periodic feedback for ML model training is shown in Table 4 as follows:

9.1 Message Functional Definition and Content 9.1.1 Messages for Basic Mobility Procedures 9.1.1.1 Handover Request This message is sent by the source NG-RAN node to the target NG-RAN node to request the preparation of resources for a handover.

Direction: source NG-RAN node→target NG-RAN node.

TABLE 4

| IE/Group Name | Presence | Range | IE type and reference | Semantics description | Criticality |
|---|---|---|---|---|---|
| . . . | . . . | | . . . | | |
| Periodic Feedback for model training | O | | 9.2.3.x | Present when the source node asks for feedback to improve the ML training | — |
| >Report Characteristics | O | | BITSTRING (SIZE(32)) | Each position in the bitmap indicates measurement | — |

TABLE 4-continued

| IE/Group Name | Presence | Range | IE type and reference | Semantics description | Criticality |
|---|---|---|---|---|---|
| | | | | object the target NG-RAN node is requested to report. First Bit = PRB Second Bit = TNL Capacity Ind Third Bit = Composite Available Capacity Fourth Bit = Number of Active UEs, Fifth Bit = RRC connections. Sixth Bit = Avg. Cell Throughput Other bits shall be ignored | |
| >Feedback Periodicity | O | ENUMERATED(500 ms, 1000 ms, 2000 ms, 5000 ms, 10000 ms, . . . 1 min, 5 min, 10 min)) | | Periodicity that can be used for reporting of current cell capacity, cell throughput, and current resource availability. If this IE does not present it means it is one time feedback | |
| >Feedback stop trigger | O | ENUMERATED (specific time duration, UE goes to idle, UE HO to 3rd cell, . . . | | It is presentonly when Feedback Periodicity is present. | |
| >Feedback duration | O | | ENUMERATED(10 s, 100 s, . . . | Present when Feedback stop triggering for ML training is set as "specific time duration" | |

In addition, the NG-RAN node 2 610 sends a message 628 to the NG-RAN node 1 606. The message 628 may represent a handover request acknowledgement message or a predicted handover request acknowledgement message. In one embodiment, the handover request message may be implemented as a HANDOVER REQUEST ACKNOWLEDGEMENT message as defined in Section 9.1.1.2 of the 3GPP TS 38.423 titled "Study of Technical Specification Group Radio Access Network; NG-RAN; Xn application protocol (XnAP)" Release 17 version 17.1.0 (2022-06), including any progeny, revisions and variants. This message is sent by a target NG-RAN node to inform a source NG-RAN node about the prepared resources at the target. The direction is from the target NG-RAN node to the source NG-RAN node. Other message types and standards may be implemented as well. Embodiments are not limited in this context.

Figure 7:
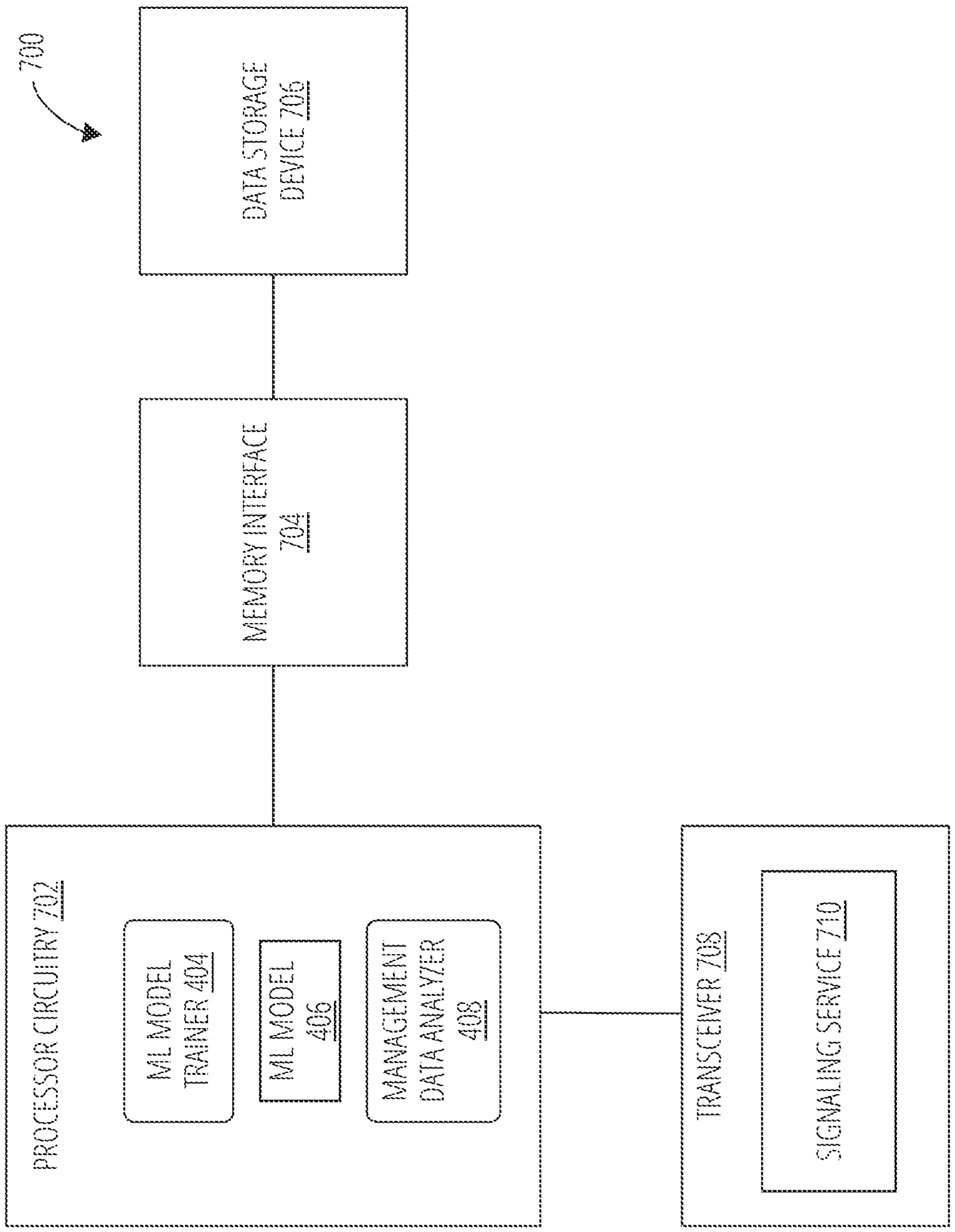
FIG. 7 illustrates an apparatus in accordance with one embodiment.

FIG. 7 illustrates an apparatus 700 suitable for an access node, such as a gNB or an eNB of a 5GNR wireless system to implement a handover request procedure such as defined in 3GPP TS 38.423 using one or more of the new IEs defined in Table 1 to support periodic feedback for ML model training.

As depicted in FIG. 7, the apparatus 700 may include a processor circuitry 702, a memory interface 704, a data storage device 706, and a transmitter/receiver ("transceiver") 708. The processor circuitry 702 may implement the logic flow 500 and/or some or all of the message flow 600. The memory interface 704 may send or receive, to or from a data storage device 706 (e.g., volatile or non-volatile memory), measurement information for measurement signaling between a first NG-RAN node 1 606 and a second NG-RAN node 2 610. The processor circuitry 702 is communicatively coupled to the memory interface 704, where the processor circuitry 702 is to initiate execution of an ML model trainer 404 for an ML model 406, or a management data analyzer 408 to implement an ML model inference 306 for the ML model 406, by the first NG-RAN node 1 606 to select an energy saving state for the first NG-RAN node 1 606, the second NG-RAN node 2 610 or a UE 602. The processor circuitry 702 may generate a handover request message 626, the handover request message 626 to request a preparation of resources for a handover of the UE. The handover request message 626 may include an IE with one or more parameters to request measurement information according to the one or more parameters, the measurement information to comprise feedback information that can be used as input to the ML model trainer 404 to train the ML model 406. The processor circuitry 702 may send an indication to the transceiver 708 to transmit the handover request message 626 from the first NG-RAN node 1 606 to the second NG-RAN node 1 606. The transceiver 708 may implement a signaling service 710 between the first NG-RAN node 1 606 and the second NG-RAN node 2 610, the signaling service 710 to transmit the handover request message 626 from the first NG-RAN node 1 606 to the second NG-RAN node 1 606 in accordance with a 3GPP standard such as 3GPP TS 38.423, or other 3GPP standards. For instance, the signaling service 710 may be implemented as an Xn interface in accordance with an Xn application protocol (XnAP). The handover request message 626 may be defined in accordance with 3GPP TS 38.423, or other 3GPP standards.

The apparatus 700 may also include the IE to have an IE group name of periodic feedback for model training, a presence of optional, and a semantics description to indicate the IE is present when the first NG-RAN node requests feedback to improve the ML training.

The apparatus 700 may also include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report.

The apparatus 700 may also include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report, the bitmap to have a sixth bit to represent average cell throughput.

The apparatus 700 may also include the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, where the semantics description to further indicate when the IE is not present the feedback is a one-time feedback.

The apparatus 700 may also include the IE to have an IE group name of feedback stop trigger, a presence of optional, an IE type and reference of enumerated with values for a specific time duration, when a user equipment (UE) goes idle, or the UE will handover to another NG-RAN node, and a semantics description that indicates the IE is present when feedback stop triggering for ML training is set as the specific time duration.

Figure 8:
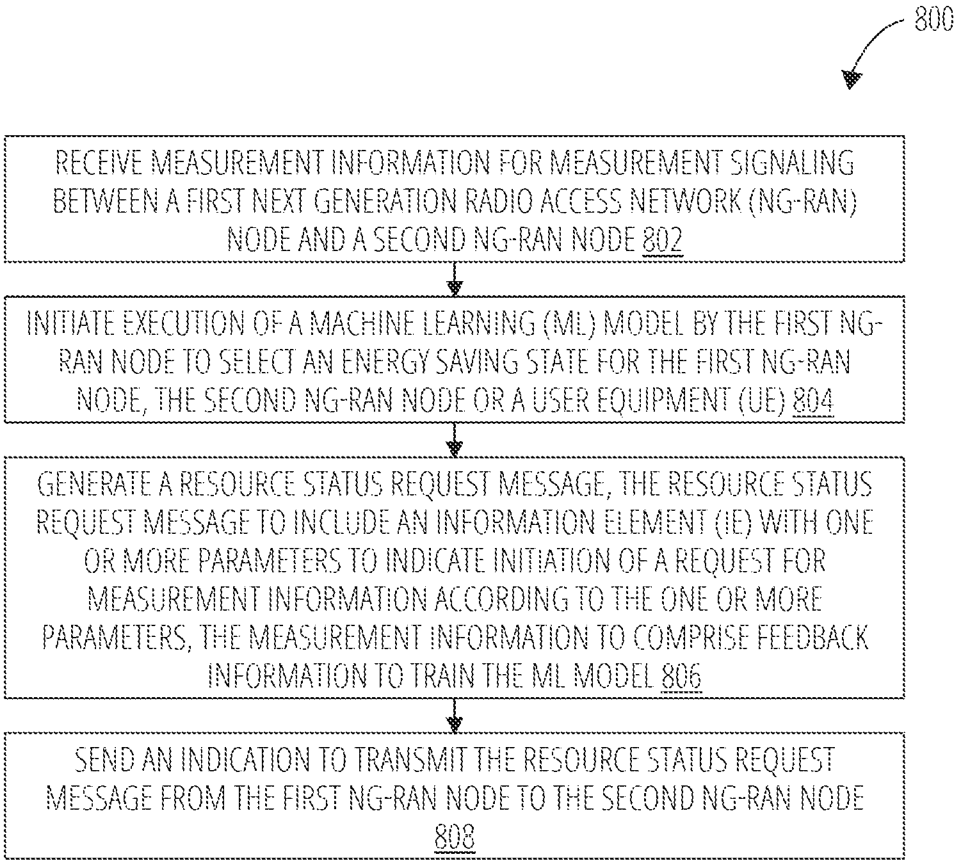
FIG. 8 illustrates a second logic flow in accordance with one embodiment.

FIG. 8 illustrates an embodiment of a logic flow 800. The logic flow 800 may be representative of some or all of the operations executed by one or more embodiments described herein. For example, the logic flow 800 may include some or all of the operations performed by the MDA ML system 400 of the wireless communications system 100. More particularly, the logic flow 800 illustrates a first alternative for the first solution for power saving, load balancing and/or mobility optimization, where ML model training and ML model inference is implemented by one or more NG-RAN nodes. Embodiments are not limited in this context.

In block 802, logic flow 800 receives measurement information for measurement signaling between a first next generation radio access network (NG-RAN) node and a second NG-RAN node. For example, the first NG-RAN node 1 606 receives measurement information for measurement signaling between the first NG-RAN node 1 606 and the second NG-RAN node 2 610.

In block 804, logic flow 800 initiates execution of a machine learning (ML) model by the first NG-RAN node to select an energy saving state for the first NG-RAN node, the second NG-RAN node or a user equipment (UE). For example, an MDAS producer 206 of the MDA ML system 400 of the first NG-RAN node 1 606 may initiate an ML model trainer 404 to train the ML model 406 for the management data analyzer 408 to use in selecting an energy saving state for one or more network nodes or UEs of the wireless communications system 100.

In block 806, logic flow 800 generates a resource status request message, the resource status request message to include an information element (IE) with one or more parameters to indicate initiation of a request for measurement information according to the one or more parameters, the measurement information to comprise feedback information to train the ML model. For example, the first NG-RAN node 1 606 may generate a resource status request message. The resource status request message may include an IE with one or more parameters to indicate initiation of a request for measurement information according to the one or more parameters. The measurement information may comprise feedback information for input into the ML ML model trainer 404 to train the ML model 406 of the MDAS producer 206 of the MDA ML system 400.

In block 808, logic flow 800 sends an indication to transmit the resource status request message from the first NG-RAN node to the second NG-RAN node. For example, the first NG-RAN node 1 606 may send an indication to transmit the resource status request message to the second NG-RAN node 2 610.

Referring again to FIG. 7, the apparatus 700 may implement the logic flow 800. For example, the apparatus 700 for an access node, includes a memory interface 704 to send or receive, to or from a data storage device 706, measurement information for measurement signaling between a first NG-RAN node 1 606 and a second NG-RAN node 2 610. The apparatus 700 also includes processor circuitry 702 communicatively coupled to the memory interface 704, the processor circuitry 702 to initiate execution of an ML model 406 by the first NG-RAN node 1 606 to select an energy saving state for the first NG-RAN node 1 606, the second NG-RAN node 2 610 or a UE 602, generate a resource status request message, the resource status request message to include an information element (IE) with one or more parameters to indicate initiation of a request for measurement information according to the one or more parameters, the measurement information to comprise feedback information to train the ML model 406, and send an indication to transmit the resource status request message from the first NG-RAN node 1 606 to the second NG-RAN node 2 610.

The apparatus 700 may also include the IE to have an IE group name of report characteristics with a semantics description for one or more bits in a bitmap, where each position in the bitmap indicates a measurement object the second NG-RAN is requested to report.

The apparatus 700 may also include the IE to have an IE group name of report characteristics with a semantics description for one or more bits in a bitmap, where each position in the bitmap indicates a measurement object the second NG-RAN is requested to report, the bitmap to have a sixth bit to represent an average cell throughput, a seventh bit to represent a predicated average throughput over a defined interval, an eighth bit to represent a confidence level of predicted information, a ninth bit to represent an average time for a user equipment (UE) to connect to a cell, or a tenth bit to represent a quantized histogram of an artificial intelligence (AI) model error.

The apparatus 700 may also include the IE to have an IE group name of prediction interval, a presence of optional, an IE type and reference of enumerated with values for 5 minutes, 10 minutes, 30 minutes or 60 minutes, and a semantics description that when a seventh bit and an eighth bit of a bitmap are present, then the IE indicates a defined interval over which the prediction has been made.

The apparatus 700 may also include the IE to have an IE group name of confidence level of a prediction, a presence of optional, an IE type and reference of enumerated with values of 0 or 100, and a semantics description that when a seventh bit and a ninth bit of a bitmap are present, then the IE indicates a confidence level of predicted information.

The apparatus 700 may also include the IE to have an IE group name of quantized histogram of an artificial intelligence (AI) model error, a presence of optional, an IE type and reference of enumerated with values of 0-10%, 10-20%, 20-30%, 30-40%, 40-50%, 50-60%, 60-70%, 70-80%, 80-90% or 100%, and a semantics description that when a seventh bit and a tenth bit of a bitmap are present, then the IE indicates a distribution of AI model error.

The apparatus 700 may also include the IE to have an IE group name of average time for a user equipment (UE) to connect to a cell, a presence of optional, an IE type and reference of enumerated with values of 20 milliseconds (ms), 40 ms, 60 ms, 80 ms, 100 ms, 120 ms, 160 ms or 200 ms, and a semantics description that when a ninth bit of a bitmap is present, then the IE indicates an average amount of time it takes for the UE to be able to connect to the cell.

The apparatus 700 may also include the IE to have an IE group name of feedback stop trigger for ML training, a presence of optional, an IE type and reference of enumerated with values for a specific time duration, a user equipment (UE) goes to idle, or the UE handover to another cell, and a semantics description that it is present only when a reporting periodicity is present.

The apparatus 700 may also include the IE to have an IE group name of feedback duration, a presence of optional, an IE type and reference of enumerated with values of 10 seconds or 100 seconds, and a semantics description that it is present when a feedback stop trigger for ML training is set to a specific time duration.

The apparatus 700 may also include the IE to have an IE group name of user equipment (UE) information, a presence of optional, and a semantics description that it is present when a feedback stop trigger for ML training is set as the UE goes to idle or the UE handover to another cell.

The apparatus 700 may also include a signaling service between the first NG-RAN node and the second NG-RAN node, the signaling service to transmit the resource status request message from the first NG-RAN node to the second NG-RAN node over an Xn interface in accordance with an Xn application protocol (XnAP).

The apparatus may also include where the resource status request message is defined in accordance with a third generation partnership project (3GPP) technical specification (TS) 38.423. Other technical features may be readily apparent to one skilled in the art from the following figures, descriptions, and claims.

Figure 9:
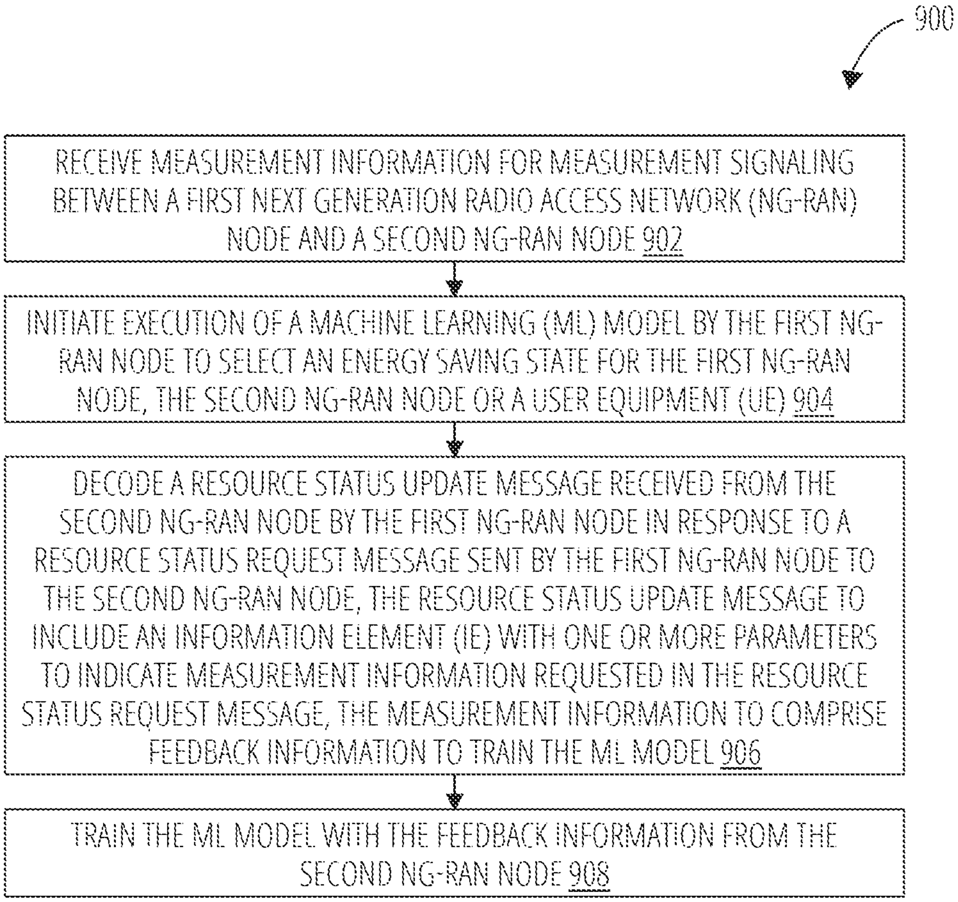
FIG. 9 illustrates a third logic flow in accordance with one embodiment.

FIG. 9 illustrates an embodiment of a logic flow 900. The logic flow 900 may be representative of some or all of the operations executed by one or more embodiments described herein. For example, the logic flow 900 may include some or all of the operations performed by the MDA ML system 400 of the wireless communications system 100. More particularly, the logic flow 900 illustrates a first alternative for the first solution for power saving, load balancing and/or mobility optimization, where ML model training and ML model inference is implemented by one or more NG-RAN nodes. Embodiments are not limited in this context.

In block 902, logic flow 900 receives measurement information for measurement signaling between a first next generation radio access network (NG-RAN) node and a second NG-RAN node. For example, the first NG-RAN node 1 606 may receive measurement information for measurement signaling between the first NG-RAN node 1 606 and the second NG-RAN node 2 610.

In block 904, logic flow 900 initiates execution of a machine learning (ML) model by the first NG-RAN node to select an energy saving state for the first NG-RAN node, the second NG-RAN node or a user equipment (UE). For example, an MDAS producer 206 of the MDA ML system 400 of the first NG-RAN node 1 606 may initiate execution of an ML model 406 by the first NG-RAN node 1 606 to select an energy saving state for the first NG-RAN node 1 606, the second NG-RAN node 2 610 or a UE 602.

In block 906, logic flow 900 decodes a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model. For example, the first NG-RAN node 1 606 may decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model.

In block 908, logic flow 900 trains the ML model with the feedback information from the second NG-RAN node. For example, the measurement information may comprise feedback information for input into the ML model trainer 404 to train the ML model 406 of the MDAS producer 206 of the MDA ML system 400.

Referring again to FIG. 7, the apparatus 700 may implement the logic flow 900. The apparatus 700 depicts an apparatus for an access node, which includes a memory interface 704 to send or receive, to or from a data storage device 706, measurement information for measurement signaling between a first NG-RAN node 1 606 and a second NG-RAN node 2 610. The apparatus 700 also includes processor circuitry 702 communicatively coupled to the memory interface 704, the processor circuitry 702 to initiate execution of an ML model 406 by the first NG-RAN node 1 606 to select an energy saving state for the first NG-RAN node 1 606, the second NG-RAN node 2 610 or a UE 602, decode a resource status update message received from the second NG-RAN node 2 610 by the first NG-RAN node 1 606 in response to a resource status request message sent by the first NG-RAN node 1 606 to the second NG-RAN node 2 610, the resource status update message to include an information element (IE) with one or more parameters to indicate measurement information requested in the resource status request message, the measurement information to comprise feedback information to train the ML model 406, and train the ML model 406 with the feedback information from the second NG-RAN node 2 610.

The apparatus 700 may also include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The apparatus 700 may also include the processor circuitry 702 to decode subsequent resource status update messages periodically received from the second NG-RAN node with updated measurement information.

The apparatus 700 may also include a signaling service 710 between the first NG-RAN node 1 606 and the second NG-RAN node 2 610, the signaling service 710 to receive the resource status update message from the second NG-RAN node 2 610 by the first NG-RAN node 1 606 over an Xn interface in accordance with an Xn application protocol (XnAP).

The apparatus 700 may also include where the resource status update message is defined in accordance with a 3GPP TS 38.423.

Figure 10:
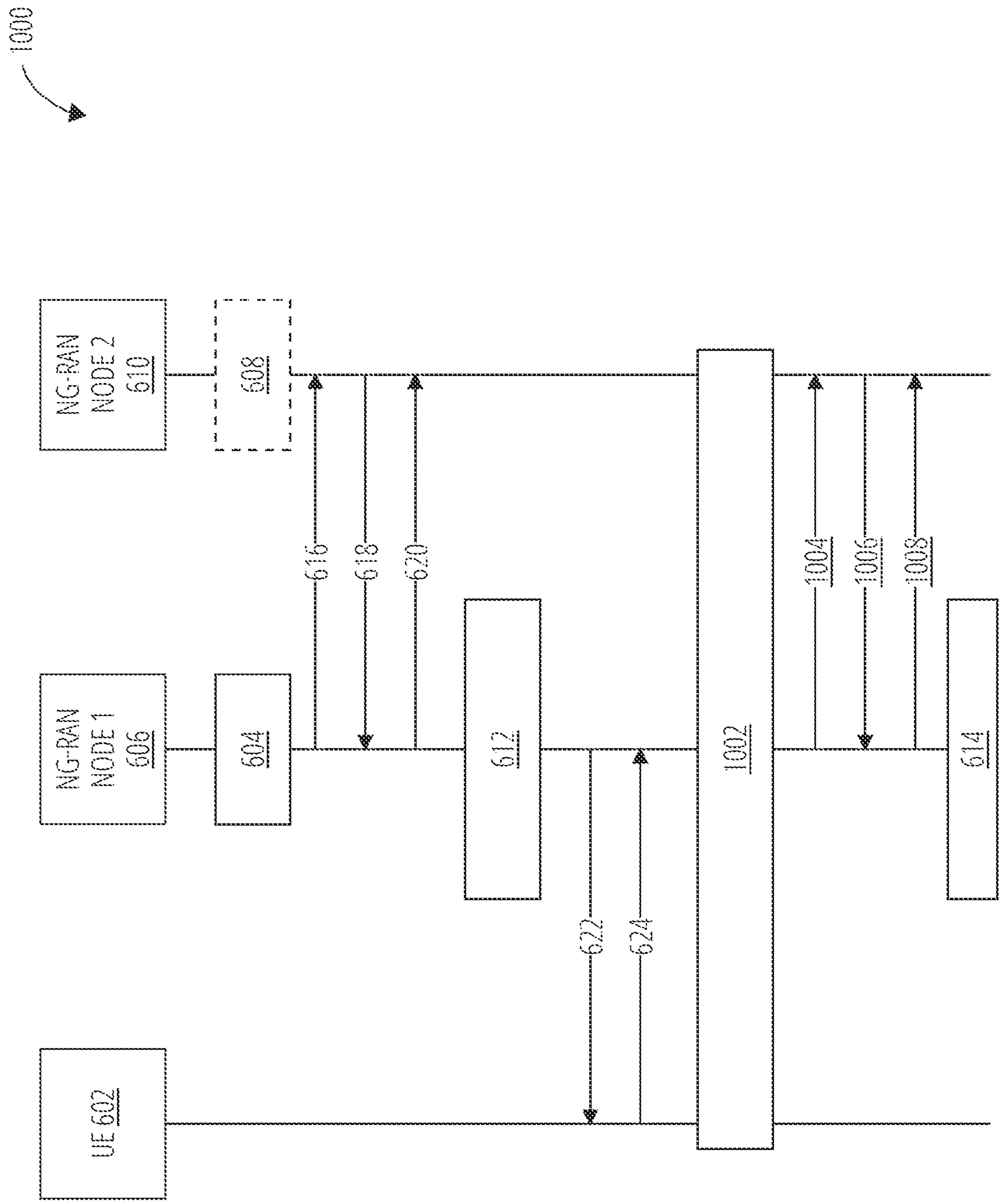
FIG. 10 illustrates a second message flow in accordance with one embodiment.

FIG. 10 illustrates a message flow 1000. The message flow 1000 illustrates a series of message exchanges between a UE 602, a first NG-RAN node 1 606, and a second NG-RAN node 2 610. The message flow 600 may enable or support the second solution which describes power saving, load balancing and/or mobility optimization implemented as a single node model for an AI/ML implementation.

To deal with energy saving issues previously described above, various ML techniques are utilized to optimize energy saving decisions by leveraging on the data collected in a NG-RAN network. The ML algorithms may predict an energy efficiency and load state for a next period, which can be used to make better decisions on selecting an energy saving state for various devices within the NG-RAN network, such as the UE 602, the first NG-RAN node 1 606, the second NG-RAN node 2 610, and other network nodes. Based on a predicted load, the system may dynamically configure the energy-saving strategy (e.g., the switch-off timing and granularity, offloading actions) to keep a balance between system performance and energy efficiency and to reduce the energy consumption.

To facilitate and support energy-saving decisions, the message flow 1000 may communicate messages to request and receive measurement information, such as feedback information, needed as input for an AI/ML model training function and/or an AI/ML model inference function, such as those described with reference to the AI and ML system 300 of FIG. 3 and/or the MDA ML system 400 of FIG. 4, to facilitate an energy savings strategy or EE for the wireless communications system 100.

As depicted in the message flow 1000, the blocks 604, 608, 612 and 614 are the same or similar to the blocks described for the message flow 600 of FIG. 6. As further depicted in the message flow 1000, the messages 616, 618, 620, 622 and 624 are the same or similar to the messages described for the message flow 600 of FIG. 6. The block 1002, and the messages 1004, 1006 and 1008 are different from the message flow 600, and are described below. In particular, the block 1002, and the messages 1004, 1006 and 1008 represent techniques where configuration information for feedback 418 is communicated after handover operations for the UE 602 are performed.

Referring again to FIG. 10, at block 1002, the NG-RAN node 1 606 initiates a handover operation to handover the UE 602 from the NG-RAN node 1 606 to the NG-RAN node 2 610. Once handover is complete, the NG-RAN node 1 606 and the NG-RAN node 2 610 may communicate a series of messages 1004, 1006 and 1008. In one embodiment, the messages 1004, 1006 and 1008 are the same or similar to the messages 616, 618 and 620, respectively. For instance, the NG-RAN node 1 606 sends a message 1004 to the NG-RAN node 2 610. The message 1004 may represent a resource status request message or a predicted resource status request message. The NG-RAN node 2 610 sends a message 1006 to the NG-RAN node 1 606. The message 1006 may represent a resource status response or a predicted resource status response message. The NG-RAN node 2 610 periodically sends a message 1008 to the NG-RAN node 1 606. The message 1008 may represent a resource status update message.

Similar to the message 630 of the message flow 600, the message 1008 may represent measurement information, or feedback information, for the ML model 406. At block 614, the MDAS producer 206 uses the feedback information as input for the ML model 406 to assist in ML training of the ML model 406, to provide better predictions or estimates for future energy saving states for various network nodes of the wireless communications system 100.

Figure 11:
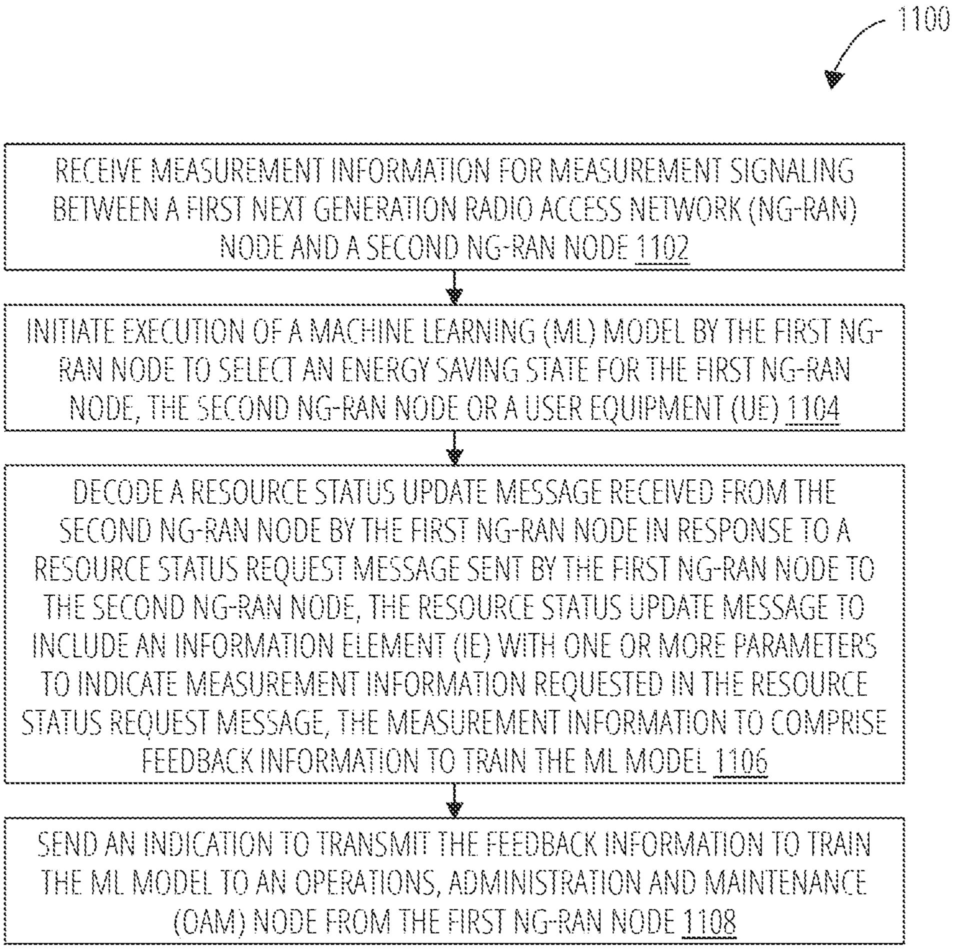
FIG. 11 illustrates a logic flow 1100 in accordance with one embodiment.

FIG. 11 illustrates an embodiment of a logic flow 1100. The logic flow 1100 may be representative of some or all of the operations executed by one or more embodiments described herein. For example, the logic flow 1100 may include some or all of the operations performed by the MDA ML system 400 of the wireless communications system 100. More particularly, the logic flow 1100 illustrates the first solution for power saving, load balancing and/or mobility optimization, where ML model training is implemented by an operations, administration, and maintenance (OAM) node and the ML model inference is implemented by one or more NG-RAN nodes. Embodiments are not limited in this context.

In block 1102, logic flow 1100 receives measurement information for measurement signaling between a first next generation radio access network (NG-RAN) node and a second NG-RAN node. For example, the first NG-RAN node 1 606 may receive measurement information for measurement signaling between the first NG-RAN node 1 606 and the second NG-RAN node 2 610.

In block 1104, logic flow 1100 initiates execution of a machine learning (ML) model by the first NG-RAN node to select an energy saving state for the first NG-RAN node, the second NG-RAN node or a user equipment (UE). For example, an MDAS producer 206 of the MDA ML system 400 of the first NG-RAN node 1 606 may initiate execution of an ML model 406 by the first NG-RAN node 1 606 to select an energy saving state for the first NG-RAN node 1 606, the second NG-RAN node 2 610 or a UE 602.

In block 1106, logic flow 1100 decodes a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model. For example, the first NG-RAN node 1 606 may decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model.

In block 1108, logic flow 1100 sends an indication to transmit the feedback information to train the ML model to an operations, administration and maintenance (OAM) node. For example, the OAM node may receive the feedback information from the NG-RAN node 1 606 and/or the NG-RAN node 2 610, and the feedback information may be input into the ML model trainer 404 to train the ML model 406 of the MDAS producer 206 of the MDA ML system 400. The OAM node may send an updated ML model 406 to the NG-RAN node 1 606 and/or the NG-RAN node 2 610.

As an example implementation for the logic flow 1100, an OAM node may implement the ML model trainer 404 of the MDAS producer 206 of the MDA ML system 400. The ML model trainer 404 may train the ML model 406, and forward the trained ML model 406 to an NG-RAN node, such as the NG-RAN node 1 606 and/or the NG-RAN node 2 610. Once handover operations for the UE 602 are complete, the NG-RAN node 1 606 and/or the NG-RAN node 2 610 may send feedback information to the OAM node. The OAM node may input the received feedback information into the ML model trainer 404 to train or update training for the ML model 406 of the MDAS producer 206 of the MDA ML system 400. The OAM node may send a trained ML model 406 or an updated trained ML model 406 to the NG-RAN node 1 606 and/or the NG-RAN node 2 610 for use in ML model inference operations for a given energy saving decisions strategy.

Referring again to FIG. 7, the apparatus 700 may implement the logic flow 1100. In one embodiment, for example, the apparatus 700 for an access node, includes a memory interface 704 to send or receive, to or from a data storage device 706, measurement information for measurement signaling between a first NG-RAN node 1 606 and a second NG-RAN node 2 610. The apparatus 700 also includes processor circuitry communicatively coupled to the memory interface 704, the processor circuitry 702 to initiate execution of an ML model 406 by the first NG-RAN node 1 606 to select an energy saving state for the first NG-RAN node 1 606, the second NG-RAN node 2 610 or a UE 602, decode a resource status update message received from the second NG-RAN node 2 610 by the first NG-RAN node 1 606 in response to a resource status request message sent by the first NG-RAN node 1 606 to the second NG-RAN node 2 610, the resource status update message to include an information element (IE) with one or more parameters to indicate measurement information requested in the resource status request message, the measurement information to comprise feedback information (e.g., feedback 418) to train the ML model 406, and send an indication to transmit the feedback information to train the ML model 406 to an operations, administration and maintenance (OAM) node from the first NG-RAN node 1 606.

The apparatus 700 may also include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The apparatus 700 may also include the processor circuitry 702 to decode subsequent resource status update messages periodically received from the second NG-RAN node with updated measurement information.

The apparatus 700 may also include a signaling service between the first NG-RAN node 1 606 and the second NG-RAN node 2 610, and the first NG-RAN node 1 606, the second NG-RAN node 2 610 and the OAM 1202, the signaling service to receive the resource status update message from the second NG-RAN node 2 610 by the first NG-RAN node 1 606 over an Xn interface in accordance with an Xn application protocol (XnAP), and the signaling service to send feedback 418 from the first NG-RAN node 1 606 or the second NG-RAN node 2 610 to the OAM 1202 over an Xn interface in accordance with the XnAP.

The apparatus 700 may also include where the resource status update message is defined in accordance with a third generation partnership project (3GPP) technical specification (TS) 38.423.

The apparatus 700 may also include a signaling service between the first NG-RAN node and the OAM node, the signaling service to transmit the resource status update message from the first NG-RAN node to the OAM node over an Xn interface in accordance with an Xn application protocol (XnAP).

The apparatus 700 may also include where the resource status update message is defined in accordance with a third generation partnership project (3GPP) technical specification (TS) 38.423.

Figure 12:
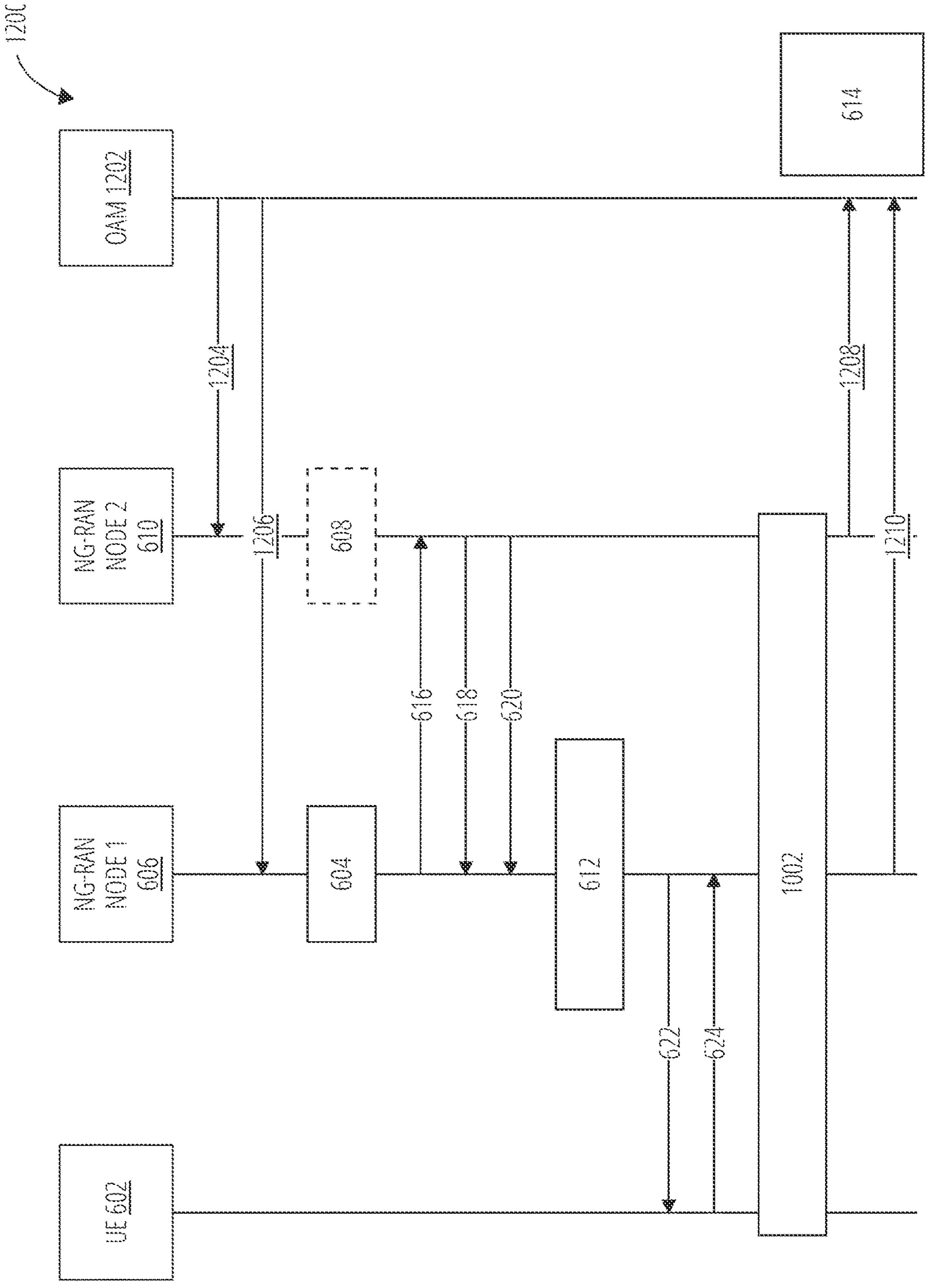
FIG. 12 illustrates a third message flow in accordance with one embodiment.

FIG. 12 illustrates a message flow 1200. The message flow 1200 illustrates a series of message exchanges between a UE 602, a first NG-RAN node 1 606, a second NG-RAN node 2 610, and an OAM node OAM 1202. The message flow 1200 may enable or support the first solution which describes power saving, load balancing and/or mobility optimization implemented as a split node model for an AI/ML implementation, where ML model training is performed by the OAM 1202 and the ML model inference is performed by the first NG-RAN node 1 606 and/or the second NG-RAN node 2 610.

To deal with energy saving issues previously described above, various ML techniques are utilized to optimize energy saving decisions by leveraging on the data collected in a NG-RAN network. The ML algorithms may predict an energy efficiency and load state for a next period, which can be used to make better decisions on selecting an energy saving state for various devices within the NG-RAN network, such as the UE 602, the first NG-RAN node 1 606, the second NG-RAN node 2 610, and other network nodes. Based on a predicted load, the system may dynamically configure the energy-saving strategy (e.g., the switch-off timing and granularity, offloading actions) to keep a balance between system performance and energy efficiency and to reduce the energy consumption.

To facilitate and support energy-saving decisions, the message flow 1200 may communicate messages to request and receive measurement information, such as feedback information, needed as input for an AI/ML model training function and/or an AI/ML model inference function, such as those described with reference to the AI and ML system 300 of FIG. 3 and/or the MDA ML system 400 of FIG. 4, to facilitate an energy savings strategy or EE for the wireless communications system 100.

As depicted in the message flow 1200, the blocks 604, 608, 612, 614 and 1002 are the same or similar to the blocks described for the message flow 600 of FIG. 6 and/or the message flow 1000 of FIG. 10. As further depicted in the message flow 1200, the messages 616, 618, 620, 622 and 624 are the same or similar to the messages described for the message flow 600 of FIG. 6. The messages 1204, 1206, 1208 and 1210 are different from the message flow 600, and are described below. In particular, the messages 1204, 1206, 1208 and 1210 represent techniques where configuration information for feedback 418 is communicated after handover operations for the UE 602 are performed, and where the ML model trainer 404 is implemented on a network node separate from the ML inference operations.

Referring again to FIG. 12, assume the OAM 1202 implements the ML model trainer 404 of the MDAS producer 206 of the MDA ML system 400. The OAM 1202 executes the ML model trainer 404 to initially train the ML model 406 and update training for the ML model 406 based on feedback information received from the NG-RAN node 1 606 and/or the NG-RAN node 2 610. The OAM 1202 may provision the initially trained ML model 406 or updated trained ML model 406 for use by the management data analyzer 408 that performs the ML inference operations for the MDAS producer 206 as implemented by the NG-RAN node 1 606 and optionally by the NG-RAN node 2 610. The OAM 1202 sends a message 1204 to the NG-RAN node 2 610 when optionally implemented. The OAM 1202 sends a message 1206 to the NG-RAN node 1 606. The messages 1204, 1206 contain the ML model 406 and configuration information for the OAM 1202 to receive any feedback information (e.g., feedback 418) needed to re-train or update the ML model 406.

The NG-RAN node 1 606 initiates a handover operation to handover the UE 602 from the NG-RAN node 1 606 to the NG-RAN node 2 610. Once handover is complete, the NG-RAN node 1 606 and the NG-RAN node 2 610 may communicate messages 1210, 1208, respectively. Similar to the message 630 of the message flow 600, the messages 1210, 1208 may each represent measurement information, or feedback information, for the ML model 406. At block 614, the MDAS producer 206 uses the feedback information as input for the ML model 406 to assist in ML training of the ML model 406, to provide better predictions or estimates for future energy saving states for various network nodes of the wireless communications system 100. The OAM 1202 may send the messages 1204, 1206 to the NG-RAN node 2 610 and the NG-RAN node 1 606, respectively, with the updated ML model 406, as well as any updates to the configuration information used by the NG-RAN node 1 606 and the NG-RAN node 2 610 to send the feedback 418.

It is worthy to note that new 3GPP messages may be defined instead of expanding or modifying existing 3GPP messages. For instance, instead of expanding the existing HANDOVER REQUEST message, HANDOVER REQUEST ACKNOWLEDGMENT message, RESOURCE STATUS REQUEST message, RESOURCE STATUS RESPONSE message, and/or RESOURCE STATUS UPDATE message as defined in 3GPP TS 38.423, an alternative way is to define new messages, such as a corresponding Predicted Handover Request message, a Predicted Handover Request Acknowledgement message, a Predicted Resource Status Request message, a Predicted Resource Status Response message, and a Predicted Resource Status Update message specifically for an information exchange for ML model training and ML-based power saving and mobility optimization triggered handover with the same information as outlined in table.

The content of the feedback for the new messages can be related to the UE's HO decisions and corresponding success or failure, current cell capacity, current average cell throughput, current resource availability, actual energy saving observed once the energy saving decision is taken. The feedback also includes error statistics as observed in the different AI/ML models. The statistics could include the CDF/histogram of the observed error in the AI/ML models. The feedback can be used for further training of the model, either locally at NG-RAN or at the OAM to better predict the success/failure of the ML model output.

FIGS. 13-16 illustrate various systems, devices and components that may implement aspects of disclosed embodiments. The systems, devices, and components may be the same, or similar to, the systems, device and components described with reference to FIG. 1.

Figure 13:
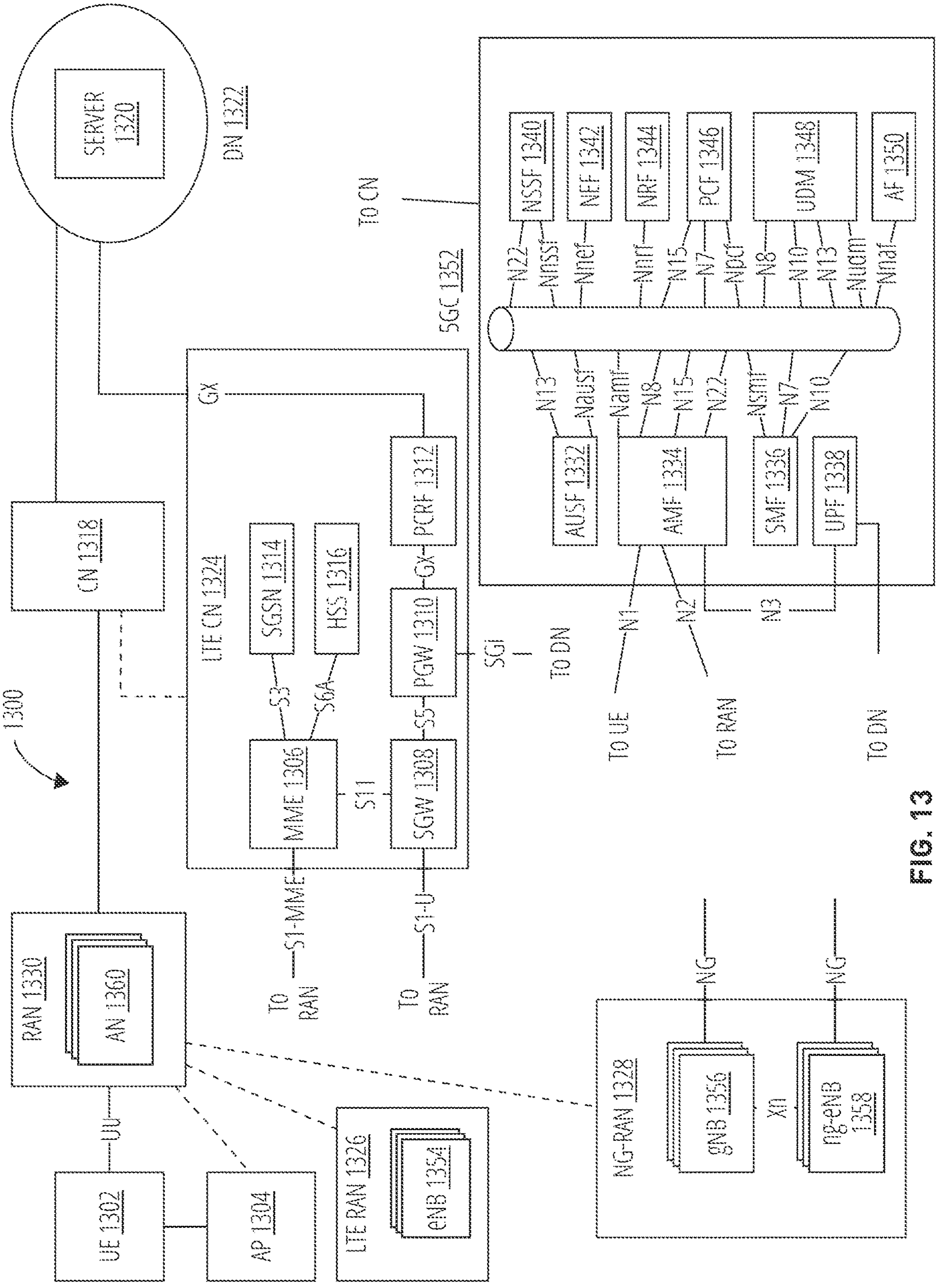
FIG. 13 illustrates a first network in accordance with one embodiment.

FIG. 13 illustrates a network 1300 in accordance with various embodiments. The network 1300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1300 may include a UE 1302, which may include any mobile or non-mobile computing device designed to communicate with a RAN 1330 via an over-the-air connection. The UE 1302 may be communicatively coupled with the RAN 1330 by a Uu interface. The UE 1302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1302 may additionally communicate with an AP 1304 via an over-the-air connection. The AP 1304 may manage a WLAN connection, which may serve to offload some/all network traffic from the RAN 1330. The connection between the UE 1302 and the AP 1304 may be consistent with any IEEE 1302.11 protocol, wherein the AP 1304 could be a wireless fidelity (Wi-Fi®) router. In some embodiments, the UE 1302, RAN 1330, and AP 1304 may utilize cellular-WLAN aggregation (for example, LWA/LWIP). Cellular-WLAN aggregation may involve the UE 1302 being configured by the RAN 1330 to utilize both cellular radio resources and WLAN resources.

The RAN 1330 may include one or more access nodes, for example, AN 1360. AN 1360 may terminate air-interface protocols for the UE 1302 by providing access stratum protocols including RRC, PDCP, RLC, MAC, and L1 protocols. In this manner, the AN 1360 may enable data/voice connectivity between CN 1318 and the UE 1302. In some embodiments, the AN 1360 may be implemented in a discrete device or as one or more software entities running on server computers as part of, for example, a virtual network, which may be referred to as a CRAN or virtual baseband unit pool. The AN 1360 be referred to as a BS, gNB, RAN node, eNB, ng-eNB, NodeB, RSU, TRxP, TRP, etc. The AN 1360 may be a macrocell base station or a low power base station for providing femtocells, picocells or other like cells having smaller coverage areas, smaller user capacity, or higher bandwidth compared to macrocells.

In embodiments in which the RAN 1330 includes a plurality of ANs, they may be coupled with one another via an X2 interface (if the RAN 1330 is an LTE RAN) or an Xn interface (if the RAN 1330 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1330 may each manage one or more cells, cell groups, component carriers, etc. to provide the UE 1302 with an air interface for network access. The UE 1302 may be simultaneously connected with a plurality of cells provided by the same or different ANs of the RAN 1330. For example, the UE 1302 and RAN 1330 may use carrier aggregation to allow the UE 1302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1330 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1302 or AN 1360 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1330 may be an LTE RAN 1326 with eNBs, for example, eNB 1354. The LTE RAN 1326 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may be operating on sub-6 GHz bands.

In some embodiments, the RAN 1330 may be an NG-RAN 1328 with gNBs, for example, gNB 1356, or ng-eNBs, for example, ng-eNB 1358. The gNB 1356 may connect with 5G-enabled UEs using a 5G NR interface. The gNB 1356 may connect with a 5G core through an NG interface, which may include an N2 interface or an N3 interface. The ng-eNB 1358 may also connect with the 5G core through an NG interface, but may connect with a UE via an LTE air interface. The gNB 1356 and the ng-eNB 1358 may connect with each other over an Xn interface.

In some embodiments, the NG interface may be split into two parts, an NG user plane (NG-U) interface, which carries traffic data between the nodes of the NG-RAN 1328 and a UPF 1338 (e.g., N3 interface), and an NG control plane (NG-C) interface, which is a signaling interface between the nodes of the NG-RAN 1328 and an AMF 1334 (e.g., N2 interface).

The NG-RAN 1328 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may be operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1302 can be configured with multiple BWPs where each BWP configuration has a different SCS. When a BWP change is indicated to the UE 1302, the SCS of the transmission is changed as well. Another use case example of BWP is related to power saving. In particular, multiple BWPs can be configured for the UE 1302 with different amount of frequency resources (for example, PRBs) to support data transmission under different traffic loading scenarios. A BWP containing a smaller number of PRBs can be used for data transmission with small traffic load while allowing power saving at the UE 1302 and in some cases at the gNB 1356. A BWP containing a larger number of PRBs can be used for scenarios with higher traffic load.

The RAN 1330 is communicatively coupled to CN 1318 that includes network elements to provide various functions to support data and telecommunications services to customers/subscribers (for example, users of UE 1302). The components of the CN 1318 may be implemented in one physical node or separate physical nodes. In some embodiments, NFV may be utilized to virtualize any or all of the functions provided by the network elements of the CN 1318 onto physical compute/storage resources in servers, switches, etc. A logical instantiation of the CN 1318 may be referred to as a network slice, and a logical instantiation of a portion of the CN 1318 may be referred to as a network sub-slice.

In some embodiments, the CN 1318 may be an LTE CN 1324, which may also be referred to as an EPC. The LTE CN 1324 may include MME 1306, SGW 1308, SGSN 1314, HSS 1316, PGW 1310, and PCRF 1312 coupled with one another over interfaces (or "reference points") as shown. Functions of the elements of the LTE CN 1324 may be briefly introduced as follows.

The MME 1306 may implement mobility management functions to track a current location of the UE 1302 to facilitate paging, bearer activation/deactivation, handovers, gateway selection, authentication, etc.

The SGW 1308 may terminate an S1 interface toward the RAN and route data packets between the RAN and the LTE CN 1324. The SGW 1308 may be a local mobility anchor point for inter-RAN node handovers and also may provide an anchor for inter-3GPP mobility. Other responsibilities may include lawful intercept, charging, and some policy enforcement.

The SGSN 1314 may track a location of the UE 1302 and perform security functions and access control. In addition, the SGSN 1314 may perform inter-EPC node signaling for mobility between different RAT networks; PDN and S-GW selection as specified by MME 1306; MME selection for handovers; etc. The S3 reference point between the MME 1306 and the SGSN 1314 may enable user and bearer information exchange for inter-3GPP access network mobility in idle/active states.

The HSS 1316 may include a database for network users, including subscription-related information to support the network entities' handling of communication sessions. The HSS 1316 can provide support for routing/roaming, authentication, authorization, naming/addressing resolution, location dependencies, etc. An S6a reference point between the HSS 1316 and the MME 1306 may enable transfer of subscription and authentication data for authenticating/authorizing user access to the LTE CN 1318.

The PGW 1310 may terminate an SGi interface toward a data network (DN) 1322 that may include an application/content server 1320. The PGW 1310 may route data packets between the LTE CN 1324 and the data network 1322. The PGW 1310 may be coupled with the SGW 1308 by an S5 reference point to facilitate user plane tunneling and tunnel management. The PGW 1310 may further include a node for policy enforcement and charging data collection (for example, PCEF). Additionally, the SGi reference point between the PGW 1310 and the data network 1322 may be an operator external public, a private PDN, or an intra-operator packet data network, for example, for provision of IMS services. The PGW 1310 may be coupled with a PCRF 1312 via a Gx reference point.

The PCRF 1312 is the policy and charging control element of the LTE CN 1324. The PCRF 1312 may be communicatively coupled to the app/content server 1320 to determine appropriate QoS and charging parameters for service flows. The PCRF 1310 may provision associated rules into a PCEF (via Gx reference point) with appropriate TFT and QCI.

In some embodiments, the CN 1318 may be a 5GC 1352. The 5GC 1352 may include an AUSF 1332, AMF 1334, SMF 1336, UPF 1338, NSSF 1340, NEF 1342, NRF 1344, PCF 1346, UDM 1348, and AF 1350 coupled with one another over interfaces (or "reference points") as shown. Functions of the elements of the 5GC 1352 may be briefly introduced as follows.

The AUSF 1332 may store data for authentication of UE 1302 and handle authentication-related functionality. The AUSF 1332 may facilitate a common authentication framework for various access types. In addition to communicating with other elements of the 5GC 1352 over reference points as shown, the AUSF 1332 may exhibit an Nausf service-based interface.

The AMF 1334 may allow other functions of the 5GC 1352 to communicate with the UE 1302 and the RAN 1330 and to subscribe to notifications about mobility events with respect to the UE 1302. The AMF 1334 may be responsible for registration management (for example, for registering UE 1302), connection management, reachability management, mobility management, lawful interception of AMF-related events, and access authentication and authorization. The AMF 1334 may provide transport for SM messages between the UE 1302 and the SMF 1336, and act as a transparent proxy for routing SM messages. AMF 1334 may also provide transport for SMS messages between UE 1302 and an SMSF. AMF 1334 may interact with the AUSF 1332 and the UE 1302 to perform various security anchor and context management functions. Furthermore, AMF 1334 may be a termination point of a RAN CP interface, which may include or be an N2 reference point between the RAN 1330 and the AMF 1334; and the AMF 1334 may be a termination point of NAS (N1) signaling, and perform NAS ciphering and integrity protection. AMF 1334 may also support NAS signaling with the UE 1302 over an N3 IWF interface.

The SMF 1336 may be responsible for SM (for example, session establishment, tunnel management between UPF 1338 and AN 1360); UE IP address allocation and management (including optional authorization); selection and control of UP function; configuring traffic steering at UPF 1338 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1334 over N2 to AN 1360; and determining SSC mode of a session. SM may refer to management of a PDU session, and a PDU session or "session" may refer to a PDU connectivity service that provides or enables the exchange of PDUs between the UE 1302 and the data network 1322.

The UPF 1338 may act as an anchor point for intra-RAT and inter-RAT mobility, an external PDU session point of interconnect to data network 1322, and a branching point to support multi-homed PDU session. The UPF 1338 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1338 may include an uplink classifier to support routing traffic flows to a data network.

The NSSF 1340 may select a set of network slice instances serving the UE 1302. The NSSF 1340 may also determine allowed NSSAI and the mapping to the subscribed S-NSSAIs, if needed. The NSSF 1340 may also determine the AMF set to be used to serve the UE 1302, or a list of candidate AMFs based on a suitable configuration and possibly by querying the NRF 1344. The selection of a set of network slice instances for the UE 1302 may be triggered by the AMF 1334 with which the UE 1302 is registered by interacting with the NSSF 1340, which may lead to a change of AMF. The NSSF 1340 may interact with the AMF 1334 via an N22 reference point; and may communicate with another NSSF in a visited network via an N31 reference point (not shown). Additionally, the NSSF 1340 may exhibit an Nnssf service-based interface.

The NEF 1342 may securely expose services and capabilities provided by 3GPP network functions for third party, internal exposure/re-exposure, AFs (e.g., AF 1350), edge computing or fog computing systems, etc. In such embodiments, the NEF 1342 may authenticate, authorize, or throttle the AFs. NEF 1342 may also translate information exchanged with the AF 1350 and information exchanged with internal network functions. For example, the NEF 1342 may translate between an AF-Service-Identifier and an internal 5GC information. NEF 1342 may also receive information from other NFs based on exposed capabilities of other NFs. This information may be stored at the NEF 1342 as structured data, or at a data storage NF using standardized interfaces. The stored information can then be re-exposed by the NEF 1342 to other NFs and AFs, or used for other purposes such as analytics. Additionally, the NEF 1342 may exhibit an Nnef service-based interface.

The NRF 1344 may support service discovery functions, receive NF discovery requests from NF instances, and provide the information of the discovered NF instances to the NF instances. NRF 1344 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1344 may exhibit the Nnrf service-based interface.

The PCF 1346 may provide policy rules to control plane functions to enforce them, and may also support unified policy framework to govern network behavior. The PCF 1346 may also implement a front end to access subscription information relevant for policy decisions in a UDR of the UDM 1348. In addition to communicating with functions over reference points as shown, the PCF 1346 exhibit an Npcf service-based interface.

The UDM 1348 may handle subscription-related information to support the network entities' handling of communication sessions, and may store subscription data of UE 1302. For example, subscription data may be communicated via an N8 reference point between the UDM 1348 and the AMF 1334. The UDM 1348 may include two parts, an application front end and a UDR. The UDR may store subscription data and policy data for the UDM 1348 and the PCF 1346, and/or structured data for exposure and application data (including PFDs for application detection, application request information for multiple UEs 1302) for the NEF 1342. The Nudr service-based interface may be exhibited by the UDR 221 to allow the UDM 1348, PCF 1346, and NEF 1342 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1348 may exhibit the Nudm service-based interface.

The AF 1350 may provide application influence on traffic routing, provide access to NEF, and interact with the policy framework for policy control.

In some embodiments, the 5GC 1352 may enable edge computing by selecting operator/3$^{rd}$ party services to be geographically close to a point that the UE 1302 is attached to the network. This may reduce latency and load on the network. To provide edge-computing implementations, the 5GC 1352 may select a UPF 1338 close to the UE 1302 and execute traffic steering from the UPF 1338 to data network 1322 via the N6 interface. This may be based on the UE subscription data, UE location, and information provided by the AF 1350. In this way, the AF 1350 may influence UPF (re)selection and traffic routing. Based on operator deployment, when AF 1350 is considered to be a trusted entity, the network operator may permit AF 1350 to interact directly with relevant NFs. Additionally, the AF 1350 may exhibit an Naf service-based interface.

The data network 1322 may represent various network operator services, Internet access, or third party services that may be provided by one or more servers including, for example, application/content server 1320.

Figure 14:
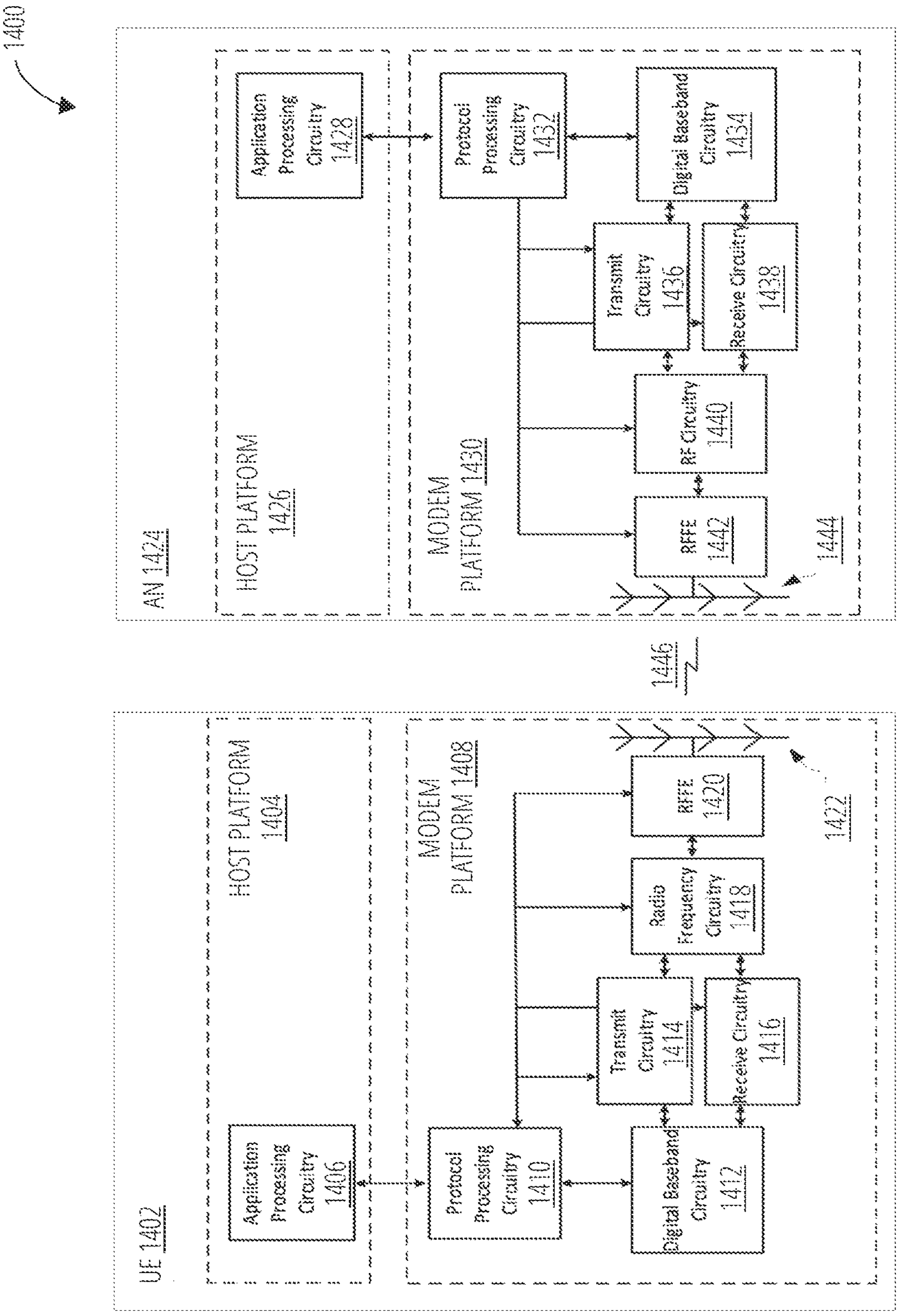
FIG. 14 illustrates a second network in accordance with one embodiment.

FIG. 14 schematically illustrates a wireless network 1400 in accordance with various embodiments. The wireless network 1400 may include a UE 1402 in wireless communication with an AN 1424. The UE 1402 and AN 1424 may be similar to, and substantially interchangeable with, like-named components described elsewhere herein.

The UE 1402 may be communicatively coupled with the AN 1424 via connection 1446. The connection 1446 is illustrated as an air interface to enable communicative coupling, and can be consistent with cellular communications protocols such as an LTE protocol or a 5G NR protocol operating at mmWave or sub-6 GHZ frequencies.

The UE 1402 may include a host platform 1404 coupled with a modem platform 1408. The host platform 1404 may include application processing circuitry 1406, which may be coupled with protocol processing circuitry 1410 of the modem platform 1408. The application processing circuitry 1406 may run various applications for the UE 1402 that source/sink application data. The application processing circuitry 1406 may further implement one or more layer operations to transmit/receive application data to/from a data network. These layer operations may include transport (for example UDP) and Internet (for example, IP) operations The protocol processing circuitry 1410 may implement one or more of layer operations to facilitate transmission or reception of data over the connection 1446. The layer operations implemented by the protocol processing circuitry 1410 may include, for example, MAC, RLC, PDCP, RRC and NAS operations.

The modem platform 1408 may further include digital baseband circuitry 1412 that may implement one or more layer operations that are "below" layer operations performed by the protocol processing circuitry 1410 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1408 may further include transmit circuitry 1414, receive circuitry 1416, RF circuitry 1418, and RF front end (RFFE) 1420, which may include or connect to one or more antenna panels 1422. Briefly, the transmit circuitry 1414 may include a digital-to-analog converter, mixer, intermediate frequency (IF) components, etc.; the receive circuitry 1416 may include an analog-to-digital converter, mixer, IF components, etc.; the RF circuitry 1418 may include a low-noise amplifier, a power amplifier, power tracking components, etc.; RFFE 1420 may include filters (for example, surface/bulk acoustic wave filters), switches, antenna tuners, beamforming components (for example, phase-array antenna components), etc. The selection and arrangement of the components of the transmit circuitry 1414, receive circuitry 1416, RF circuitry 1418, RFFE 1420, and antenna panels 1422 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1410 may include one or more instances of control circuitry (not shown) to provide control functions for the transmit/receive components.

A UE reception may be established by and via the antenna panels 1422, RFFE 1420, RF circuitry 1418, receive circuitry 1416, digital baseband circuitry 1412, and protocol processing circuitry 1410. In some embodiments, the antenna panels 1422 may receive a transmission from the AN 1424 by receive-beamforming signals received by a plurality of antennas/antenna elements of the one or more antenna panels 1422.

A UE transmission may be established by and via the protocol processing circuitry 1410, digital baseband circuitry 1412, transmit circuitry 1414, RF circuitry 1418, RFFE 1420, and antenna panels 1422. In some embodiments, the transmit components of the UE 1424 may apply a spatial filter to the data to be transmitted to form a transmit beam emitted by the antenna elements of the antenna panels 1422.

Similar to the UE 1402, the AN 1424 may include a host platform 1426 coupled with a modem platform 1430. The host platform 1426 may include application processing circuitry 1428 coupled with protocol processing circuitry 1432 of the modem platform 1430. The modem platform may further include digital baseband circuitry 1434, transmit circuitry 1436, receive circuitry 1438, RF circuitry 1440, RFFE circuitry 1442, and antenna panels 1444. The components of the AN 1424 may be similar to and substantially interchangeable with like-named components of the UE 1402. In addition to performing data transmission/reception as described above, the components of the A 1404 may perform various logical functions that include, for example, RNC functions such as radio bearer management, uplink and downlink dynamic radio resource management, and data packet scheduling.

Figure 15:
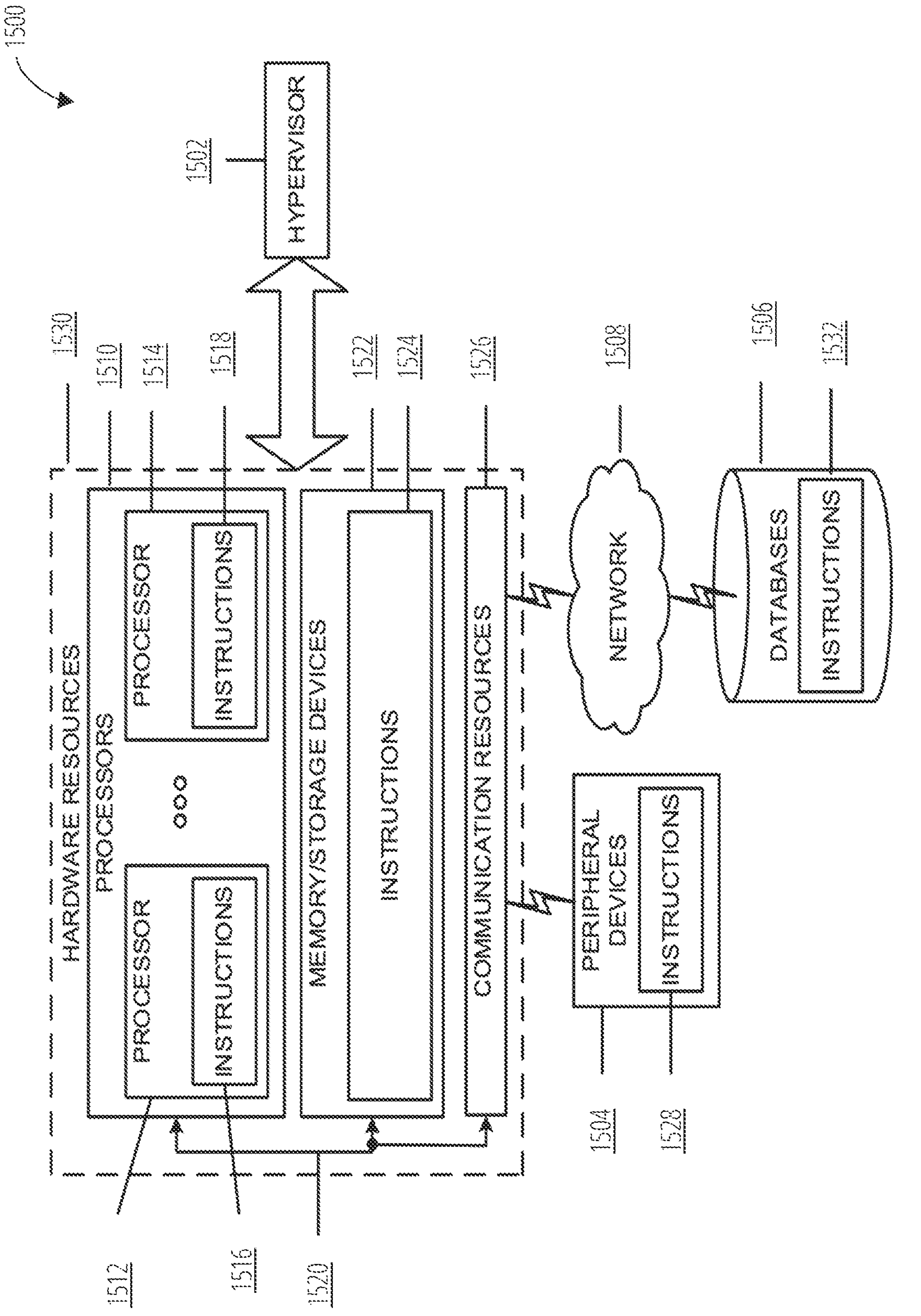
FIG. 15 illustrates a third network in accordance with one embodiment.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1530 including one or more processors (or processor cores) 1510, one or more memory/storage devices 1522, and one or more communication resources 1526, each of which may be communicatively coupled via a bus 1520 or other interface circuitry. For embodiments where node virtualization (e.g., NFV) is utilized, a hypervisor 1502 may be executed to provide an execution environment for one or more network slices/sub-slices to utilize the hardware resources 1530.

The processors 1510 may include, for example, a processor 1512 and a processor 1514. The processors 1510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1522 may include main memory, disk storage, or any suitable combination thereof. The memory/storage devices 1522 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1526 may include interconnection or network interface controllers, components, or other suitable devices to communicate with one or more peripheral devices 1504 or one or more databases 1506 or other network elements via a network 1508. For example, the communication resources 1526 may include wired communication components (e.g., for coupling via USB, Ethernet, etc.), cellular communication components, NFC components, Bluetooth® (or Bluetooth® Low Energy) components, Wi-Fi® components, and other communication components.

Instructions 106, 1518, 1524, 1528, 1532 may comprise software, a program, an application, an applet, an app, or other executable code for causing at least any of the processors 1510 to perform any one or more of the methodologies discussed herein. The instructions 106, 1518, 1524, 1528, 1532 may reside, completely or partially, within at least one of the processors 1510 (e.g., within the processor's cache memory), the memory/storage devices 1522, or any suitable combination thereof. Furthermore, any portion of the instructions 106, 1518, 1524, 1528, 1532 may be transferred to the hardware resources 1530 from any combination of the peripheral devices 1504 or the databases 1506. Accordingly, the memory of processors 1510, the memory/storage devices 1522, the peripheral devices 1504, and the databases 1506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 16:
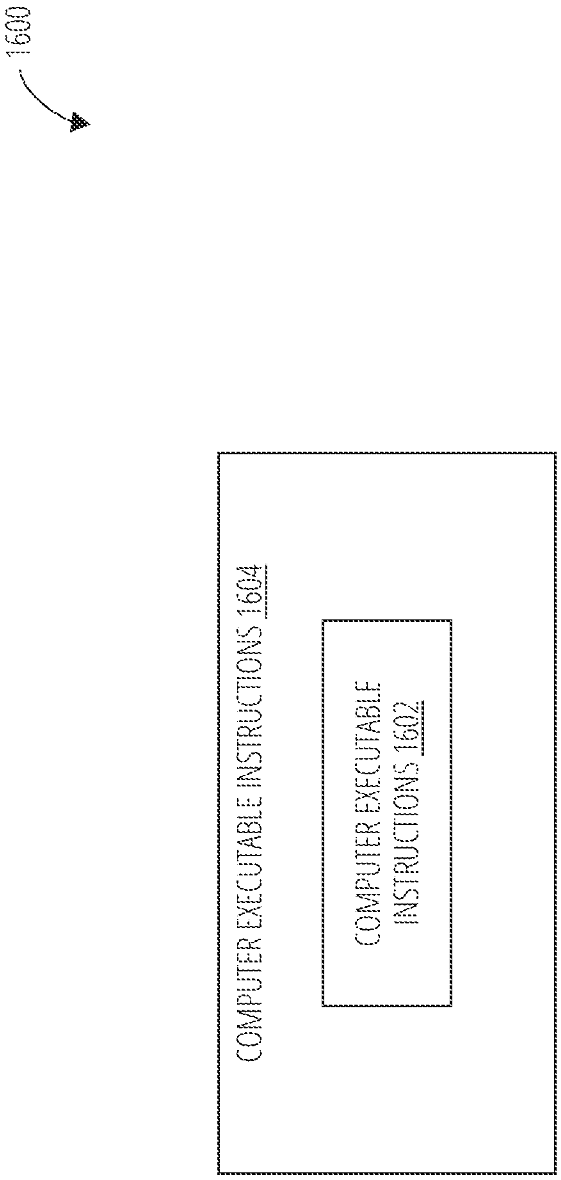
FIG. 16 illustrates an aspect of the subject matter in accordance with one embodiment.

FIG. 16 illustrates computer readable storage medium 1600. Computer readable storage medium 1700 may comprise any non-transitory computer-readable storage medium or machine-readable storage medium, such as an optical, magnetic or semiconductor storage medium. In various embodiments, computer readable storage medium 1600 may comprise an article of manufacture. In some embodiments, computer readable storage medium 1600 may store computer executable instructions 1602 with which circuitry can execute. For example, computer executable instructions 1602 can include computer executable instructions 1602 to implement operations described with respect to logic flows 500, 800 and 900. Examples of computer readable storage medium 1600 or machine-readable storage medium 1600 may include any tangible media capable of storing electronic data, including volatile memory or non-volatile memory, removable or non-removable memory, erasable or non-erasable memory, writeable or re-writeable memory, and so forth. Examples of computer executable instructions 1602 may include any suitable type of code, such as source code, compiled code, interpreted code, executable code, static code, dynamic code, object-oriented code, visual code, and the like.

First Set of Examples

Example 1 may include an NG-RAN having different power saving capabilities may have possibly different levels of energy saving states and each energy saving state may correspond to different types of power saving strategies in the cell, depending on its capability and configuration.

Example 2 may include the NG-RAN in example 1 or some other example herein, wherein may employ strategies that include but are not limited to: increase SSB periodicity, lower the advertised Bandwidth, DTX for BS, increase the SIB blocks periodicity, use wake-up signaling features/DRX features to increase the number of UEs in sleep mode, Secondary cell activation/deactivation, carrier aggregation turn on/off, primary/Macro cell activation/deactivation, partial HO, complete HO, Power on, Power off.

Example 3 may include the NG-RAN in example 1 or some other examples herein, wherein is running an AI model to predict the power saving level as well as system performance and corresponding strategies.

Example 4 may include the input parameter of the AI model in example 3 or some other example herein, wherein includes information from the node itself and its neighboring cells: Current cell capacity, current/predicted avg. cell throughput, current resource availability, current # of UEs it can handle, current RRC connections, current average time for a UE to connect to the cell from idle state, current CQI information, current mobility information of UEs, the confidence level of predictions for each neighboring cells' data, predicted UE latency and predicted UE throughput.

Example 5 may include the output parameter of the AI model in example 3 or some other example herein, wherein includes: the Energy saving strategy in terms of mechanisms adopted (e.g. mechanisms listed on page 4 under section 5.1), the avg. predicted cell throughput, the confidence level of the prediction, the time interval for the prediction, the action to be taken in terms of HO strategy for a single UE or a group of UEs.

Example 6 may include NG-RAN could provide periodic feedback to OAM to improve the AI model training if model training occurs in OAM.

Example 7 may include if handover (HO) occurs because of power saving or mobility optimization, target NG-RAN could provide periodic feedback to source NG-RAN node to improve the AI model training when model training occurs at the source NG-RAN.

Example 8 may include the setting parameter for the feedback in example 6 or some other example herein, wherein could be configured by OAM and sent to NG-RAN along with the AI model.

Example 9 may include the setting parameter for feedback in example 7 or some other example herein, wherein could be configured by source NG-RAN node and sent to target NG-RAN node during HO preparation.

Example 10 may include the setting parameter for feedback in example 7 or some other examples herein, wherein could be configured by source NG-RAN node and sent to target NG-RAN node through Resource Status Request/Response procedure.

Example 11 may include the setting parameter for feedback in example 6 and example 7 or some other examples herein, wherein includes periodicity of feedback and feedback stop triggering.

Example 12 may include the NG-RAN node in example 1 or some other examples herein, when sending Resource Status Request may use the modified procedure as described in FIG. 1 where the Resource Status Response may be sent periodically to be used for training of local AI model.

Example 13 may include the Resource Status Request message in example 13 or some other examples herein, wherein to include optional additional new requests in the Report characteristics field, namely Avg. Cell Throughput, Predicted avg. throughput over Interval X, Confidence level of predicted information, Avg. time for UE to connect to cell Example 14 may include the Resource Status Response message sent in response to the Request message in example 13 to include corresponding new measurement fields as described in example 13.

Example 15 may include a process for obtaining new parameters for input to AI energy saving models as described in example 4 or some other examples herein, wherein may be alternatively obtained by defining a new message and message procedure altogether called as Predicted Resource Status Request/Predicted Resource Status Response/Predicted Resource Status Update Example 16 may include the new messages described in example 15 or some other example herein, wherein to include the new parameters as described in example 13.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

Second Set of Examples

In one example, an apparatus for an access node, includes a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of a machine learning (ML) model by the first NG-RAN node to select an energy saving state for the first NG-RAN node, the second NG-RAN node or a user equipment (UE), generate a handover request message, the handover request message to request a preparation of resources for a handover of a user equipment (UE), the handover request message to include an information element (IE) with one or more parameters to request measurement information according to the one or more parameters, the measurement information to comprise feedback information to train the ML model, and send an indication to transmit the handover request message from the first NG-RAN node to the second NG-RAN node.

The apparatus example may include where the IE to have an IE group name of periodic feedback for model training, a presence of optional, and a semantics description to indicate the IE is present when the first NG-RAN node requests feedback to improve the ML training.

The apparatus example may include where the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report.

The apparatus example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report, the bitmap to have a sixth bit to represent average cell throughput.

The apparatus example may include the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, where the semantics description to further indicate when the IE is not present the feedback is a one-time feedback.

The apparatus example may include the IE to have an IE group name of feedback stop trigger, a presence of optional, an IE type and reference of enumerated with values for a specific time duration, when a user equipment (UE) goes idle, or the UE will handover to another NG-RAN node, and a semantics description that indicates the IE is present when feedback stop triggering for ML training is set as the specific time duration.

The apparatus example may include a signaling service between the first NG-RAN node and the second NG-RAN node, the signaling service to transmit the handover request message from the first NG-RAN node to the second NG-RAN node over an Xn interface in accordance with an Xn application protocol (XnAP).

The apparatus example may include where the handover request message is defined in accordance with a third generation partnership project (3GPP) technical specification (TS) 38.423. Other technical features may be readily apparent to one skilled in the art from the following figures, descriptions, and claims.

For example, a method for an access node, includes receiving measurement information for measurement signaling between a first next generation radio access network (NG-RAN) node and a second NG-RAN node, initiating execution of a machine learning (ML) model by the first NG-RAN node to select an energy saving state for the first NG-RAN node, the second NG-RAN node or a user equipment (UE), generating a handover request message, the handover request message to request a preparation of resources for a handover of a user equipment (UE), the handover request message to include an information element (IE) with one or more parameters to request measurement information according to the one or more parameters, the measurement information to comprise feedback information to train the ML model, and sending an indication to transmit the handover request message from the first NG-RAN node to the second NG-RAN node.

The method example may include the IE to have an IE group name of periodic feedback for model training, a presence of optional, and a semantics description to indicate the IE is present when the first NG-RAN node requests feedback to improve the ML training.

The method example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report.

The method example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report, the bitmap to have a sixth bit to represent average cell throughput.

The method example may include the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, where the semantics description to further indicate when the IE is not present the feedback is a one-time feedback.

The method example may include the IE to have an IE group name of feedback stop trigger, a presence of optional, an IE type and reference of enumerated with values for a specific time duration, when a user equipment (UE) goes idle, or the UE will handover to another NG-RAN node, and a semantics description that indicates the IE is present when feedback stop triggering for ML training is set as the specific time duration.

The method example may include transmitting the handover request message from the first NG-RAN node to the second NG-RAN node over an Xn interface in accordance with an Xn application protocol (XnAP).

The method example may include where the handover request message is defined in accordance with a third generation partnership project (3GPP) technical specification (TS) 38.423. Other technical features may be readily apparent to one skilled in the art from the following figures, descriptions, and claims.

For example, a non-transitory computer-readable storage medium, the computer-readable storage medium including instructions that when executed by a processor, cause the processor to receive measurement information for measurement signaling between a first next generation radio access network (NG-RAN) node and a second NG-RAN node, initiate execution of a machine learning (ML) model by the first NG-RAN node to select an energy saving state for the first NG-RAN node, the second NG-RAN node or a user equipment (UE), generate a handover request message, the handover request message to request a preparation of resources for a handover of a user equipment (UE), the handover request message to include an information element (IE) with one or more parameters to request measurement information according to the one or more parameters, the measurement information to comprise feedback information to train the ML model, and send an indication to transmit the handover request message from the first NG-RAN node to the second NG-RAN node.

The computer-readable storage medium example may include the IE to have an IE group name of periodic feedback for model train, a presence of optional, and a semantics description to indicate the IE is present when the first NG-RAN node requests feedback to improve the ML training.

The computer-readable storage medium example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report.

The computer-readable storage medium example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report, the bitmap to have a sixth bit to represent average cell throughput.

The computer-readable storage medium example may include the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, where the semantics description to further indicate when the IE is not present the feedback is a one-time feedback.

The computer-readable storage medium example may include the IE to have an IE group name of feedback stop trigger, a presence of optional, an IE type and reference of enumerated with values for a specific time duration, when a user equipment (UE) goes idle, or the UE will handover to another NG-RAN node, and a semantics description that indicates the IE is present when feedback stop trigger for ML training is set as the specific time duration.

The computer-readable storage medium example may include instructions that when executed by the processor cause the processor to transmit the handover request message from the first NG-RAN node to the second NG-RAN node over an Xn interface in accordance with an Xn application protocol (XnAP).

The computer-readable storage medium example may include where the handover request message is defined in accordance with a third generation partnership project (3GPP) technical specification (TS) 38.423. Other technical features may be readily apparent to one skilled in the art from the following figures, descriptions, and claims.

For example, an apparatus for an access node, includes a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of a machine learning (ML) model by the first NG-RAN node to select an energy saving state for the first NG-RAN node, the second NG-RAN node or a user equipment (UE), decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and train the ML model with the feedback information from the second NG-RAN node.

The apparatus example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The apparatus example may include the processor circuitry to decode subsequent resource status update messages periodically received from the second NG-RAN node with updated measurement information.

The apparatus example may include a signaling service between the first NG-RAN node and the second NG-RAN node, the signaling service to receive the resource status update message from the second NG-RAN node by the first NG-RAN node over an Xn interface in accordance with an Xn application protocol (XnAP).

The apparatus example may include where the resource status update message is defined in accordance with a third generation partnership project (3GPP) technical specification (TS) 38.423. Other technical features may be readily apparent to one skilled in the art from the following figures, descriptions, and claims.

For example, a method for an access node, includes receiving measurement information for measurement signaling between a first next generation radio access network (NG-RAN) node and a second NG-RAN node, initiating execution of a machine learning (ML) model by the first NG-RAN node to select an energy saving state for the first NG-RAN node, the second NG-RAN node or a user equipment (UE), decoding a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and training the ML model with the feedback information from the second NG-RAN node.

The method example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The method example may include the processor circuitry to decode subsequent resource status update messages periodically received from the second NG-RAN node with updated measurement information.

The method example may include receiving the resource status update message from the second NG-RAN node by the first NG-RAN node over an Xn interface in accordance with an Xn application protocol (XnAP).

The method example may include where the resource status update message is defined in accordance with a third generation partnership project (3GPP) technical specification (TS) 38.423. Other technical features may be readily apparent to one skilled in the art from the following figures, descriptions, and claims.

For example, a non-transitory computer-readable storage medium, the computer-readable storage medium including instructions that when executed by a processor, cause the processor to receive measurement information for measurement signaling between a first next generation radio access network (NG-RAN) node and a second NG-RAN node, initiate execution of a machine learning (ML) model by the first NG-RAN node to select an energy saving state for the first NG-RAN node, the second NG-RAN node or a user equipment (UE), decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and train the ML model with the feedback information from the second NG-RAN node.

The computer-readable storage medium example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The computer-readable storage medium example may include instructions that when executed by the processor cause the processor to decode subsequent resource status update messages periodically received from the second NG-RAN node with updated measurement information.

The computer-readable storage medium example may include instructions that when executed by the processor cause the processor to receive the resource status update message from the second NG-RAN node by the first NG-RAN node over an Xn interface in accordance with an Xn application protocol (XnAP).

The computer-readable storage medium example may include where the resource status update message is defined in accordance with a third generation partnership project (3GPP) technical specification (TS) 38.423. Other technical features may be readily apparent to one skilled in the art from the following figures, descriptions, and claims.

For example, an apparatus for an access node, includes a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of a machine learning (ML) model by the first NG-RAN node to select an energy saving state for the first NG-RAN node, the second NG-RAN node or a user equipment (UE), generate a resource status request message, the resource status request message to include an information element (IE) with one or more parameters to indicate initiation of a request for measurement information according to the one or more parameters, the measurement information to comprise feedback information to train the ML model, and send an indication to transmit the resource status request message from the first NG-RAN node to the second NG-RAN node.

The apparatus example may include the IE to have an IE group name of report characteristics with a semantics description for one or more bits in a bitmap, where each position in the bitmap indicates a measurement object the second NG-RAN is requested to report.

The apparatus example may include the IE to have an IE group name of report characteristics with a semantics description for one or more bits in a bitmap, where each position in the bitmap indicates a measurement object the second NG-RAN is requested to report, the bitmap to have a sixth bit to represent an average cell throughput, a seventh bit to represent a predicated average throughput over a defined interval, an eighth bit to represent a confidence level of predicted information, a ninth bit to represent an average time for a user equipment (UE) to connect to a cell, or a tenth bit to represent a quantized histogram of an artificial intelligence (AI) model error.

The apparatus example may include the IE to have an IE group name of prediction interval, a presence of optional, an IE type and reference of enumerated with values for 5 minutes, 10 minutes, 30 minutes or 60 minutes, and a semantics description that when a seventh bit and an eighth bit of a bitmap are present, then the IE indicates a defined interval over which the prediction has been made.

The apparatus example may include the IE to have an IE group name of confidence level of a prediction, a presence of optional, an IE type and reference of enumerated with values of 0 or 100, and a semantics description that when a seventh bit and a ninth bit of a bitmap are present, then the IE indicates a confidence level of predicted information.

The apparatus example may include the IE to have an IE group name of quantized histogram of an artificial intelligence (AI) model error, a presence of optional, an IE type and reference of enumerated with values of 0-10%, 10-20%, 20-30%, 30-40%, 40-50%, 50-60%, 60-70%, 70-80%, 80-90% or 100%, and a semantics description that when a seventh bit and a tenth bit of a bitmap are present, then the IE indicates a distribution of AI model error.

The apparatus example may include the IE to have an IE group name of average time for a user equipment (UE) to connect to a cell, a presence of optional, an IE type and reference of enumerated with values of 20 milliseconds (ms), 40 ms, 60 ms, 80 ms, 100 ms, 120 ms, 160 ms or 200 ms, and a semantics description that when a ninth bit of a bitmap is present, then the IE indicates an average amount of time it takes for the UE to be able to connect to the cell.

The apparatus example may include the IE to have an IE group name of feedback stop trigger for ML training, a presence of optional, an IE type and reference of enumerated with values for a specific time duration, a user equipment (UE) goes to idle, or the UE handover to another cell, and a semantics description that it is present only when a reporting periodicity is present.

The apparatus example may include the IE to have an IE group name of feedback duration, a presence of optional, an IE type and reference of enumerated with values of 10 seconds or 100 seconds, and a semantics description that it is present when a feedback stop trigger for ML training is set to a specific time duration.

The apparatus example may include the IE to have an IE group name of user equipment (UE) information, a presence of optional, and a semantics description that it is present when a feedback stop trigger for ML training is set as the UE goes to idle or the UE handover to another cell.

The apparatus example may include a signaling service between the first NG-RAN node and the second NG-RAN node, the signaling service to transmit the resource status request message from the first NG-RAN node to the second NG-RAN node over an Xn interface in accordance with an Xn application protocol (XnAP).

The apparatus example may include where the resource status request message is defined in accordance with a third generation partnership project (3GPP) technical specification (TS) 38.423. Other technical features may be readily apparent to one skilled in the art from the following figures, descriptions, and claims.

For example, a method for an access node, includes receiving measurement information for measurement signaling between a first next generation radio access network (NG-RAN) node and a second NG-RAN node, initiating execution of a machine learning (ML) model by the first NG-RAN node to select an energy saving state for the first NG-RAN node, the second NG-RAN node or a user equipment (UE), generating a resource status request message, the resource status request message to include an information element (IE) with one or more parameters to indicate initiation of a request for measurement information according to the one or more parameters, the measurement information to comprise feedback information to train the ML model, and sending an indication to transmit the resource status request message from the first NG-RAN node to the second NG-RAN node.

The method example may include the IE to have an IE group name of report characteristics with a semantics description for one or more bits in a bitmap, where each position in the bitmap indicates a measurement object the second NG-RAN is requested to report.

The method example may include the IE to have an IE group name of report characteristics with a semantics description for one or more bits in a bitmap, where each position in the bitmap indicates a measurement object the second NG-RAN is requested to report, the bitmap to have a sixth bit to represent an average cell throughput, a seventh bit to represent a predicated average throughput over a defined interval, an eighth bit to represent a confidence level of predicted information, a ninth bit to represent an average time for a user equipment (UE) to connect to a cell, or a tenth bit to represent a quantized histogram of an artificial intelligence (AI) model error.

The method example may include the IE to have an IE group name of prediction interval, a presence of optional, an IE type and reference of enumerated with values for 5 minutes, 10 minutes, 30 minutes or 60 minutes, and a semantics description that when a seventh bit and an eighth bit of a bitmap are present, then the IE indicates a defined interval over which the prediction has been made.

The method example may include the IE to have an IE group name of confidence level of a prediction, a presence of optional, an IE type and reference of enumerated with values of 0 or 100, and a semantics description that when a seventh bit and a ninth bit of a bitmap are present, then the IE indicates a confidence level of predicted information.

The method example may include the IE to have an IE group name of quantized histogram of an artificial intelligence (AI) model error, a presence of optional, an IE type and reference of enumerated with values of 0-10%, 10-20%, 20-30%, 30-40%, 40-50%, 50-60%, 60-70%, 70-80%, 80-90% or 100%, and a semantics description that when a seventh bit and a tenth bit of a bitmap are present, then the IE indicates a distribution of AI model error.

The method example may include the IE to have an IE group name of average time for a user equipment (UE) to connect to a cell, a presence of optional, an IE type and reference of enumerated with values of 20 milliseconds (ms), 40 ms, 60 ms, 80 ms, 100 ms, 120 ms, 160 ms or 200 ms, and a semantics description that when a ninth bit of a bitmap is present, then the IE indicates an average amount of time it takes for the UE to be able to connect to the cell.

The method example may include the IE to have an IE group name of feedback stop trigger for ML training, a presence of optional, an IE type and reference of enumerated with values for a specific time duration, a user equipment (UE) goes to idle, or the UE handover to another cell, and a semantics description that it is present only when a reporting periodicity is present.

The method example may include the IE to have an IE group name of feedback duration, a presence of optional, an IE type and reference of enumerated with values of 10 seconds or 100 seconds, and a semantics description that it is present when a feedback stop trigger for ML training is set to a specific time duration.

The method example may include the IE to have an IE group name of user equipment (UE) information, a presence of optional, and a semantics description that it is present when a feedback stop trigger for ML training is set as the UE goes to idle or the UE handover to another cell.

The method example may include transmitting the resource status request message from the first NG-RAN node to the second NG-RAN node over an Xn interface in accordance with an Xn application protocol (XnAP).

The method example may include where the resource status request message is defined in accordance with a third generation partnership project (3GPP) technical specification (TS) 38.423. Other technical features may be readily apparent to one skilled in the art from the following figures, descriptions, and claims.

For example, a non-transitory computer-readable storage medium, the computer-readable storage medium including instructions that when executed by a processor, cause the processor to receive measurement information for measurement signaling between a first next generation radio access network (NG-RAN) node and a second NG-RAN node, initiate execution of a machine learning (ML) model by the first NG-RAN node to select an energy saving state for the first NG-RAN node, the second NG-RAN node or a user equipment (UE), generate a resource status request message, the resource status request message to include an information element (IE) with one or more parameters to indicate initiation of a request for measurement information according to the one or more parameters, the measurement information to comprise feedback information to train the ML model, and send an indication to transmit the resource status request message from the first NG-RAN node to the second NG-RAN node.

The computer-readable storage medium example may include the IE to have an IE group name of report characteristics with a semantics description for one or more bits in a bitmap, where each position in the bitmap indicates a measurement object the second NG-RAN is requested to report.

The computer-readable storage medium example may include the IE to have an IE group name of report characteristics with a semantics description for one or more bits in a bitmap, where each position in the bitmap indicates a measurement object the second NG-RAN is requested to report, the bitmap to have a sixth bit to represent an average cell throughput, a seventh bit to represent a predicated average throughput over a defined interval, an eighth bit to represent a confidence level of predicted information, a ninth bit to represent an average time for a user equipment (UE) to connect to a cell, or a tenth bit to represent a quantized histogram of an artificial intelligence (AI) model error.

The computer-readable storage medium example may include the IE to have an IE group name of prediction interval, a presence of optional, an IE type and reference of enumerated with values for 5 minutes, 10 minutes, 30 minutes or 60 minutes, and a semantics description that when a seventh bit and an eighth bit of a bitmap are present, then the IE indicates a defined interval over which the prediction has been made.

The computer-readable storage medium example may include the IE to have an IE group name of confidence level of a prediction, a presence of optional, an IE type and reference of enumerated with values of 0 or 100, and a semantics description that when a seventh bit and a ninth bit of a bitmap are present, then the IE indicates a confidence level of predicted information.

The computer-readable storage medium example may include the IE to have an IE group name of quantized histogram of an artificial intelligence (AI) model error, a presence of optional, an IE type and reference of enumerated with values of 0-10%, 10-20%, 20-30%, 30-40%, 40-50%, 50-60%, 60-70%, 70-80%, 80-90% or 100%, and a semantics description that when a seventh bit and a tenth bit of a bitmap are present, then the IE indicates a distribution of AI model error.

The computer-readable storage medium example may include the IE to have an IE group name of average time for a user equipment (UE) to connect to a cell, a presence of optional, an IE type and reference of enumerated with values of 20 milliseconds (ms), 40 ms, 60 ms, 80 ms, 100 ms, 120 ms, 160 ms or 200 ms, and a semantics description that when a ninth bit of a bitmap is present, then the IE indicates an average amount of time it takes for the UE to be able to connect to the cell.

The computer-readable storage medium example may include the IE to have an IE group name of feedback stop trigger for ML train, a presence of optional, an IE type and reference of enumerated with values for a specific time duration, a user equipment (UE) goes to idle, or the UE handover to another cell, and a semantics description that it is present only when a reporting periodicity is present.

The computer-readable storage medium example may include the IE to have an IE group name of feedback duration, a presence of optional, an IE type and reference of enumerated with values of 10 seconds or 100 seconds, and a semantics description that it is present when a feedback stop trigger for ML traine is set to a specific time duration.

The computer-readable storage medium example may include the IE to have an IE group name of user equipment (UE) information, a presence of optional, and a semantics description that it is present when a feedback stop trigger for ML traine is set as the UE goes to idle or the UE handover to another cell.

The computer-readable storage medium example may include instructions that when executed by the processor cause the processor to transmit the resource status request message from the first NG-RAN node to the second NG-RAN node over an Xn interface in accordance with an Xn application protocol (XnAP).

The computer-readable storage medium example may include where the resource status request message is defined in accordance with a third generation partnership project (3GPP) technical specification (TS) 38.423. Other technical features may be readily apparent to one skilled in the art from the following figures, descriptions, and claims.

For example, an apparatus for an access node, includes a memory interface to send or receive, to or from a data storage device, measurement information for measurement signaling between a first next generation radio access network (NG-RAN) node and a second NG-RAN node. The apparatus also includes processor circuitry communicatively coupled to the memory interface, the processor circuitry to initiate execution of a machine learning (ML) model by the first NG-RAN node to select an energy saving state for the first NG-RAN node, the second NG-RAN node or a user equipment (UE), decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and send an indication to transmit the feedback information to train the ML model to an operations, administration and maintenance (OAM) node from the first NG-RAN node.

The apparatus example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The apparatus example may include the processor circuitry to decode subsequent resource status update messages periodically received from the second NG-RAN node with updated measurement information.

The apparatus example may include a signaling service between the first NG-RAN node and the second NG-RAN node, the signaling service to receive the resource status update message from the second NG-RAN node by the first NG-RAN node over an Xn interface in accordance with an Xn application protocol (XnAP).

The apparatus example may include where the resource status update message is defined in accordance with a third generation partnership project (3GPP) technical specification (TS) 38.423.

The apparatus example may include a signaling service between the first NG-RAN node and the OAM node, the signaling service to transmit the resource status update message from the first NG-RAN node to the OAM node over an Xn interface in accordance with an Xn application protocol (XnAP).

The apparatus example may include where the resource status update message is defined in accordance with a third generation partnership project (3GPP) technical specification (TS) 38.423. Other technical features may be readily apparent to one skilled in the art from the following figures, descriptions, and claims.

For example, a method for an access node, includes receiving measurement information for measurement signaling between a first next generation radio access network (NG-RAN) node and a second NG-RAN node, initiating execution of a machine learning (ML) model by the first NG-RAN node to select an energy saving state for the first NG-RAN node, the second NG-RAN node or a user equipment (UE), decoding a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and sending an indication to transmit the feedback information to train the ML model to an operations, administration and maintenance (OAM) node from the first NG-RAN node.

The method example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The method example may include the processor circuitry to decode subsequent resource status update messages periodically received from the second NG-RAN node with updated measurement information.

The method example may include receiving the resource status update message from the second NG-RAN node by the first NG-RAN node over an Xn interface in accordance with an Xn application protocol (XnAP).

The method example may include where the resource status update message is defined in accordance with a third generation partnership project (3GPP) technical specification (TS) 38.423.

The method example may include transmitting the resource status update message from the first NG-RAN node to the OAM node over an Xn interface in accordance with an Xn application protocol (XnAP).

The method example may include where the resource status update message is defined in accordance with a third generation partnership project (3GPP) technical specification (TS) 38.423. Other technical features may be readily apparent to one skilled in the art from the following figures, descriptions, and claims.

For example, a non-transitory computer-readable storage medium, the computer-readable storage medium including instructions that when executed by a processor, cause the processor to receive measurement information for measurement signaling between a first next generation radio access network (NG-RAN) node and a second NG-RAN node, initiate execution of a machine learning (ML) model by the first NG-RAN node to select an energy saving state for the first NG-RAN node, the second NG-RAN node or a user equipment (UE), decode a resource status update message received from the second NG-RAN node by the first NG-RAN node in response to a resource status request message sent by the first NG-RAN node to the second NG-RAN node, the resource status update message to include an information element (IE) with one or more parameters to indicate measurement information requested in the resource status request message, the measurement information to comprise feedback information to train the ML model, and send an indication to transmit the feedback information to train the ML model to an operations, administration and maintenance (OAM) node from the first NG-RAN node.

The computer-readable storage medium example may include the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

The computer-readable storage medium example may include instructions that when executed by the processor cause the processor to decode subsequent resource status update messages periodically received from the second NG-RAN node with updated measurement information.

The computer-readable storage medium example may include instructions that when executed by the processor cause the processor to receive the resource status update message from the second NG-RAN node by the first NG-RAN node over an Xn interface in accordance with an Xn application protocol (XnAP).

The computer-readable storage medium example may include where the resource status update message is defined in accordance with a third generation partnership project (3GPP) technical specification (TS) 38.423.

The computer-readable storage medium example may include instructions that when executed by the processor cause the processor to transmit the resource status update message from the first NG-RAN node to the OAM node over an Xn interface in accordance with an Xn application protocol (XnAP).

The computer-readable storage medium example may include where the resource status update message is defined in accordance with a third generation partnership project (3GPP) technical specification (TS) 38.423. Other technical features may be readily apparent to one skilled in the art from the following figures, descriptions, and claims.

For example, a non-transitory computer-readable storage medium, the computer-readable storage medium including instructions that when executed by a processor, cause the processor to receive measurement information for measurement signaling between a first next generation radio access network (NG-RAN) node and a second NG-RAN node, initiate execution of a machine learning (ML) model by the first NG-RAN node to select an energy saving state for the first NG-RAN node, the second NG-RAN node or a user equipment (UE), generate a handover request message, the handover request message to request a preparation of resources for a handover of a user equipment (UE), the handover request message to include an information element (IE) with one or more parameters to request measurement information according to the one or more parameters, the measurement information to comprise feedback information to train the ML model, and send an indication to transmit the handover request message from the first NG-RAN node to the second NG-RAN node.

The computer-readable storage medium example may include the IE to have an IE group name of periodic feedback for model train, a presence of optional, and a semantics description to indicate the IE is present when the first NG-RAN node requests feedback to improve the ML training.

The computer-readable storage medium example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report.

The computer-readable storage medium example may include the IE to have an IE group name of report characteristics, a presence of optional, an IE type and reference of a bitstring with a size of 32 bits, and a semantics description for one or more bits in a bitmap, where each position in the bitmap indicates a measurement object the second NG-RAN is requested to report, the bitmap to have a sixth bit to represent average cell throughput.

The computer-readable storage medium example may include the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, where the semantics description to further indicate when the IE is not present the feedback is a one-time feedback.

The computer-readable storage medium example may include the IE to have an IE group name of feedback stop trigger, a presence of optional, an IE type and reference of enumerated with values for a specific time duration, when a user equipment (UE) goes idle, or the UE will handover to another NG-RAN node, and a semantics description that indicates the IE is present when feedback stop trigger for ML training is set as the specific time duration.

The computer-readable storage medium example may include instructions that when executed by the processor cause the processor to transmit the handover request message from the first NG-RAN node to the second NG-RAN node over an Xn interface in accordance with an Xn application protocol (XnAP). Other technical features may be readily apparent to one skilled in the art from the following figures, descriptions, and claims.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus for an access node, comprising:

a memory interface to send or receive, to or from a data storage device, measurement information for measurement signaling between a first next generation radio access network (NG-RAN) node and a second NG-RAN node; and processor circuitry communicatively coupled to the memory interface, the processor circuitry to:

initiate execution of a machine learning (ML) model by the first NG-RAN node to select an energy saving state for the first NG-RAN node, the second NG-RAN node or a user equipment (UE);

generate a third generation partnership project (3GPP) message to include an information element (IE) with one or more parameters to request measurement information according to the one or more parameters, the measurement information to comprise feedback information to train the ML model, wherein the feedback information comprises a measurement of energy savings of the first NG-RAN node, the second NG-RAN node, or the UE by the selected energy saving state; and send an indication to transmit the 3GPP message from the first NG-RAN node to the second NG-RAN node.

2. The apparatus of claim 1, the IE to have an IE group name of periodic feedback for model training, a presence of optional, and a semantics description to indicate the IE is present when the first NG-RAN node requests feedback to improve the ML training.

3. The apparatus of claim 1, the IE to have an IE group name of report characteristics, a presence of optional, an IE type and reference of a bitstring with a size of 32 bits, and a semantics description for one or more bits in a bitmap, wherein each position in the bitmap indicates a measurement object the second NG-RAN is requested to report.

4. The apparatus of claim 1, the IE to have an IE group name of report characteristics, a presence of optional, an IE type and reference of a bitstring with a size of 32 bits, and a semantics description for one or more bits in a bitmap, wherein each position in the bitmap indicates a measurement object the second NG-RAN is requested to report, the bitmap to have a sixth bit to represent average cell throughput.

5. The apparatus of claim 1, the IE to have an IE group name of feedback periodicity, a presence of optional, an IE type and reference of enumerated with values of 500 milliseconds (ms), 1000 ms, 2000 ms, 5000 ms, 10000 ms, 1 minute, 5 minutes or 10 minutes, and a semantics description that indicates periodicity can be used for reporting of current cell capacity, cell throughput, and current resource availability, wherein the semantics description to further indicate when the IE is not present the feedback is a one time feedback.

6. The apparatus of claim 1, the IE to have an IE group name of feedback stop trigger, a presence of optional, an IE type and reference of enumerated with values for a specific time duration, when a user equipment (UE) goes idle, or the UE will handover to another NG RAN node, and a semantics description that indicates the IE is present when feedback stop triggering for ML training is set as the specific time duration.

7. The apparatus of claim 1, comprising a signaling service between the first NG-RAN node and the second NG-RAN node, the signaling service to transmit the 3GPP message from the first NG-RAN node to the second NG-RAN node over an Xn interface in accordance with an Xn application protocol (XnAP).

8. An apparatus for an access node, comprising:

a memory interface to send or receive, to or from a data storage device, measurement information for measurement signaling between a first next generation radio access network (NG-RAN) node and a second NG-RAN node; and processor circuitry communicatively coupled to the memory interface, the processor circuitry to:

initiate execution of a machine learning (ML) model by the first NG-RAN node to select an energy saving state for the first NG-RAN node, the second NG-RAN node or a user equipment (UE);

decode a message to include an information element (IE) with one or more parameters to indicate measurement information requested in the message, the measurement information to comprise feedback information to train the ML model, wherein the feedback information comprises a measurement of energy savings of the selected energy saving state; and train the ML model with the feedback information from the second NG-RAN node.

9. The apparatus of claim 8, the IE to have an IE group name of cell measurement result, a cell measurement result item, a predicted average throughput over a defined interval, a prediction interval, a confidence level of a prediction, a quantized histogram of an artificial intelligence (AI) model error, an average time for a user equipment (UE) to connect to a cell, an average cell throughput, or UE information.

10. The apparatus of claim 8, the processor circuitry to decode subsequent messages periodically received from the second NG-RAN node with updated measurement information.

11. The apparatus of claim 8, comprising a signaling service between the first NG-RAN node and the second NG-RAN node, the signaling service to receive the message from the second NG-RAN node by the first NG-RAN node over an Xn interface in accordance with an Xn application protocol (XnAP).

12. An apparatus for an access node, comprising:

a memory interface to send or receive, to or from a data storage device, measurement information for measurement signaling between a first next generation radio access network (NG-RAN) node and a second NG-RAN node; and processor circuitry communicatively coupled to the memory interface, the processor circuitry to:

initiate execution of a machine learning (ML) model by the first NG-RAN node to select an energy saving state for the first NG-RAN node, the second NG-RAN node or a user equipment (UE);

generate a message to include an information element (IE) with one or more parameters to indicate initiation of a request for measurement information according to the one or more parameters, the measurement information to comprise feedback information to train the ML model, wherein the feedback information is associated with the selected energy saving state; and send an indication to transmit the message from the first NG RAN node to the second NG-RAN node.

13. The apparatus of claim 12, the IE to have an IE group name of report characteristics with a semantics description for one or more bits in a bitmap, wherein each position in the bitmap indicates a measurement object the second NG-RAN is requested to report.

14. The apparatus of claim 12, the IE to have an IE group name of report characteristics with a semantics description for one or more bits in a bitmap, wherein each position in the bitmap indicates a measurement object the second NG-RAN is requested to report, the bitmap to have a sixth bit to represent an average cell throughput, a seventh bit to represent a predicated average throughput over a defined interval, an eighth bit to represent a confidence level of predicted information, a ninth bit to represent an average time for a user equipment (UE) to connect to a cell, or a tenth bit to represent a quantized histogram of an artificial intelligence (AI) model error.

15. The apparatus of claim 12, the IE to have an IE group name of prediction interval, a presence of optional, an IE type and reference of enumerated with values for 5 minutes, 10 minutes, 30 minutes or 60 minutes, and a semantics description that when a seventh bit and an eighth bit of a bitmap are present, then the IE indicates a defined interval over which the prediction has been made.

16. The apparatus of claim 12, the IE to have an IE group name of confidence level of a prediction, a presence of optional, an IE type and reference of enumerated with values of 0 or 100, and a semantics description that when a seventh bit and a ninth bit of a bitmap are present, then the IE indicates a confidence level of predicted information.

17. The apparatus of claim 12, the IE to have an IE group name of quantized histogram of an artificial intelligence (AI) model error, a presence of optional, an IE type and reference of enumerated with values of 0-10%, 10-20%, 20-30%, 30-40%, 40-50%, 50-60%, 60-70%, 70-80%, 80-90% or 100%, and a semantics description that when a seventh bit and a tenth bit of a bitmap are present, then the IE indicates a distribution of AI model error.

18. The apparatus of claim 12, the IE to have an IE group name of average time for a user equipment (UE) to connect to a cell, a presence of optional, an IE type and reference of enumerated with values of 20 milliseconds (ms), 40 ms, 60 ms, 80 ms, 100 ms, 120 ms, 160 ms or 200 ms, and a semantics description that when a ninth bit of a bitmap is present, then the IE indicates an average amount of time it takes for the UE to be able to connect to the cell.

19. The apparatus of claim 12, the IE to have an IE group name of feedback stop trigger for ML training, a presence of optional, an IE type and reference of enumerated with values for a specific time duration, a user equipment (UE) goes to idle, or the UE handover to another cell, and a semantics description that it is present only when a reporting periodicity is present.

20. The apparatus of claim 12, the IE to have an IE group name of feedback duration, a presence of optional, an IE type and reference of enumerated with values of 10 seconds or 100 seconds, and a semantics description that it is present when a feedback stop trigger for ML training is set to a specific time duration.

* * * * *